United States Patent
Sequera et al.

(10) Patent No.: US 11,459,876 B2
(45) Date of Patent: *Oct. 4, 2022

(54) DOWNHOLE WIRELESS COMMUNICATION SYSTEM THROUGH ADJACENT WELLS

(71) Applicants: Daniel Ernesto Sequera, Houston, TX (US); John K. Wakefield, Cypress, TX (US); Ronnie David Russell, Cypress, TX (US)

(72) Inventors: Daniel Ernesto Sequera, Houston, TX (US); John K. Wakefield, Cypress, TX (US); Ronnie David Russell, Cypress, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 133 days.

This patent is subject to a terminal disclaimer.

(21) Appl. No.: 16/807,820

(22) Filed: Mar. 3, 2020

(65) Prior Publication Data
US 2021/0277775 A1 Sep. 9, 2021

(51) Int. Cl.
*E21B 47/13* (2012.01)
*G01V 3/34* (2006.01)

(52) U.S. Cl.
CPC ............... *E21B 47/13* (2020.05); *G01V 3/34* (2013.01)

(58) Field of Classification Search
CPC .................................. E21B 47/13; G01V 3/34
See application file for complete search history.

(56) References Cited

U.S. PATENT DOCUMENTS

| | | | |
|---|---|---|---|
| 2011/0247806 A1 | 10/2011 | Harris | |
| 2012/0139748 A1* | 6/2012 | Hay | G01V 11/002 340/854.1 |
| 2014/0239957 A1* | 8/2014 | Zhang | E21B 47/113 324/334 |
| 2016/0194951 A1* | 7/2016 | Hay | E21B 44/005 175/45 |
| 2016/0258275 A1* | 9/2016 | Wu | G06F 17/11 |
| 2017/0229893 A1* | 8/2017 | Sequera | E21B 41/00 |
| 2017/0241259 A1 | 8/2017 | White et al. | |
| 2017/0254193 A1* | 9/2017 | Wu | E21B 43/305 |
| 2017/0371062 A1 | 12/2017 | Schmidt et al. | |
| 2019/0338633 A1* | 11/2019 | Donderici | E21B 47/0228 |

OTHER PUBLICATIONS

International Search Report and Written Opinion for International Application No. PCT/US2021/020590; International Filing Date Mar. 3, 2021; dated Jun. 15, 2021; 8 Pages.

* cited by examiner

*Primary Examiner* — Amine Benlagsir
(74) *Attorney, Agent, or Firm* — Cantor Colburn LLP

(57) ABSTRACT

A method of drilling a wellbore system, including determining a conductive formation layer from a plurality of formation layers having a first well extending therethrough, the first well having a first work string therein, the first work string including a device, placing a second well at a distance from the first well, the distance selected to allow communication of an electrical signal between the first well and the second well through the conductive formation layer based on a resistivity of the electrically conductive formation layer, disposing a second work string in the second well, and communicating the electrical signal from the second work string to the first work string through the electrically conductive formation layer to operate the device.

16 Claims, 29 Drawing Sheets

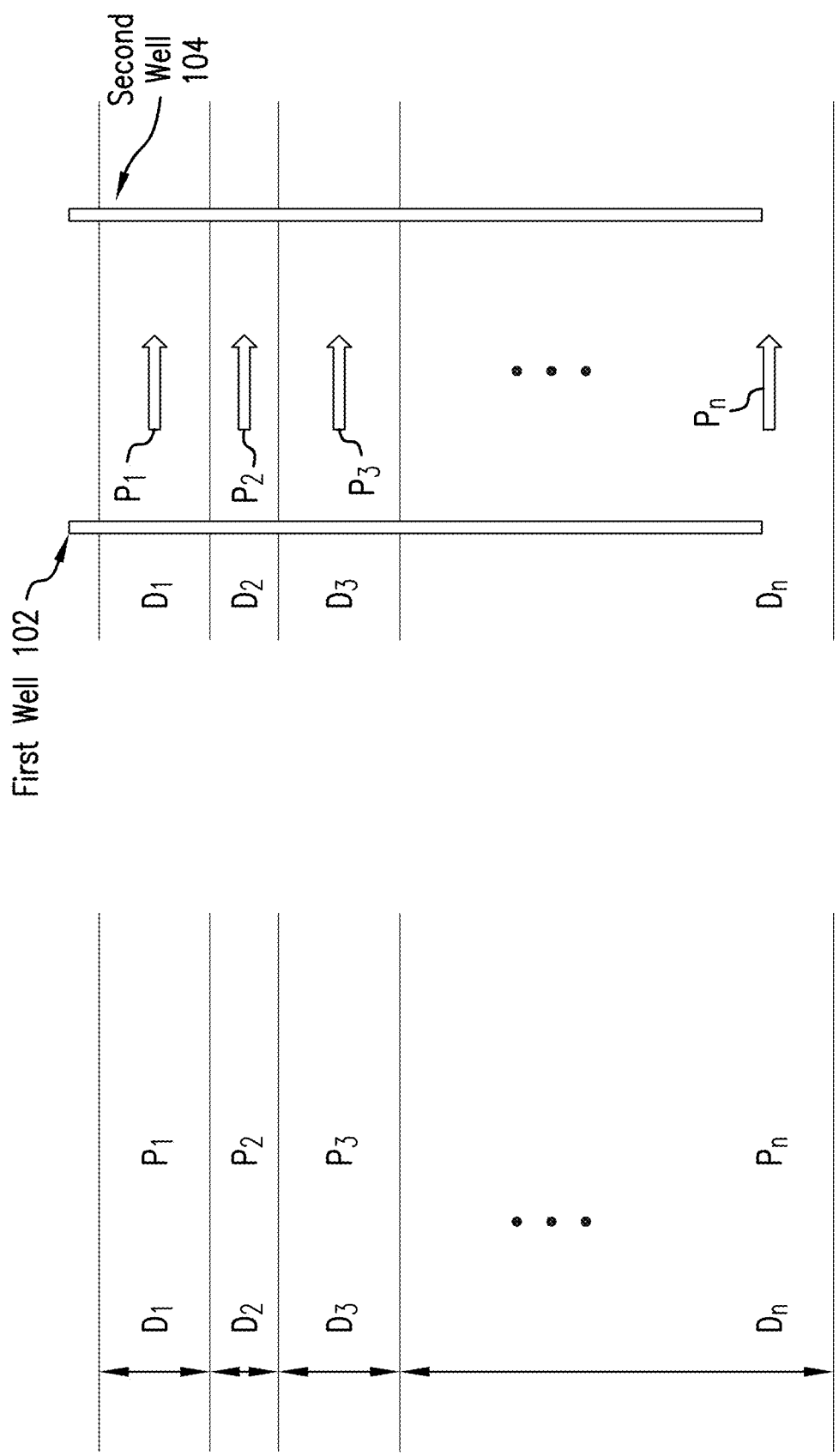

US 11,459,876 B2

1

DOWNHOLE WIRELESS COMMUNICATION SYSTEM THROUGH ADJACENT WELLS

BACKGROUND

In the resource recovery industry, various devices deploying in a wellbore, such as liner hangers and frac sleeves, are operated or actuated by an electrical current. Often the current is provided by a power supply at a surface location. Wiring from a surface location to the downhole devices is not always available and providing the wiring downhole can be expensive. Therefore, there is a need to be able to use deliver electricity downhole using existing technologies and structures.

SUMMARY

A method of drilling a wellbore system, including determining a conductive formation layer from a plurality of formation layers having a first well extending therethrough, the first well having a first work string therein, the first work string including a device; placing a second well at a distance from the first well, the distance selected to allow communication of an electrical signal between the first well and the second well through the conductive formation layer based on a resistivity of the electrically conductive formation layer, disposing a second work string in the second well; and communicating the electrical signal from the second work string to the first work string through the electrically conductive formation layer to operate the device.

A wellbore system including a first well extending through a plurality of formations, the first well having a first work string disposed therein, the plurality of formations including a conductive formation layer; a second well extending through the conductive formation layer, the second well having a second work string disposed therein, the second well located at a distance from the first well, the distance selected to allow communication of an electrical signal between the first well and the second well through the electrically conductive formation layer based on a resistivity of the electrically conductive formation layer; a downhole device on the first work string operable using the current conducted from the second well to the first well; and an electrical signal generator for injecting the current into the second work string, wherein the electrical signal passes from the second work string to the first work string via the electrically conductive formation layer to operate the device.

BRIEF DESCRIPTION OF THE DRAWINGS

The following descriptions should not be considered limiting in any way. With reference to the accompanying drawings, like elements are numbered alike:

FIG. 5a show side view of a formation showing a plurality of formation layers;

FIG. 5b shows a formation between two vertical wellbores passing through horizontal formation layers;

2

Figure 2:
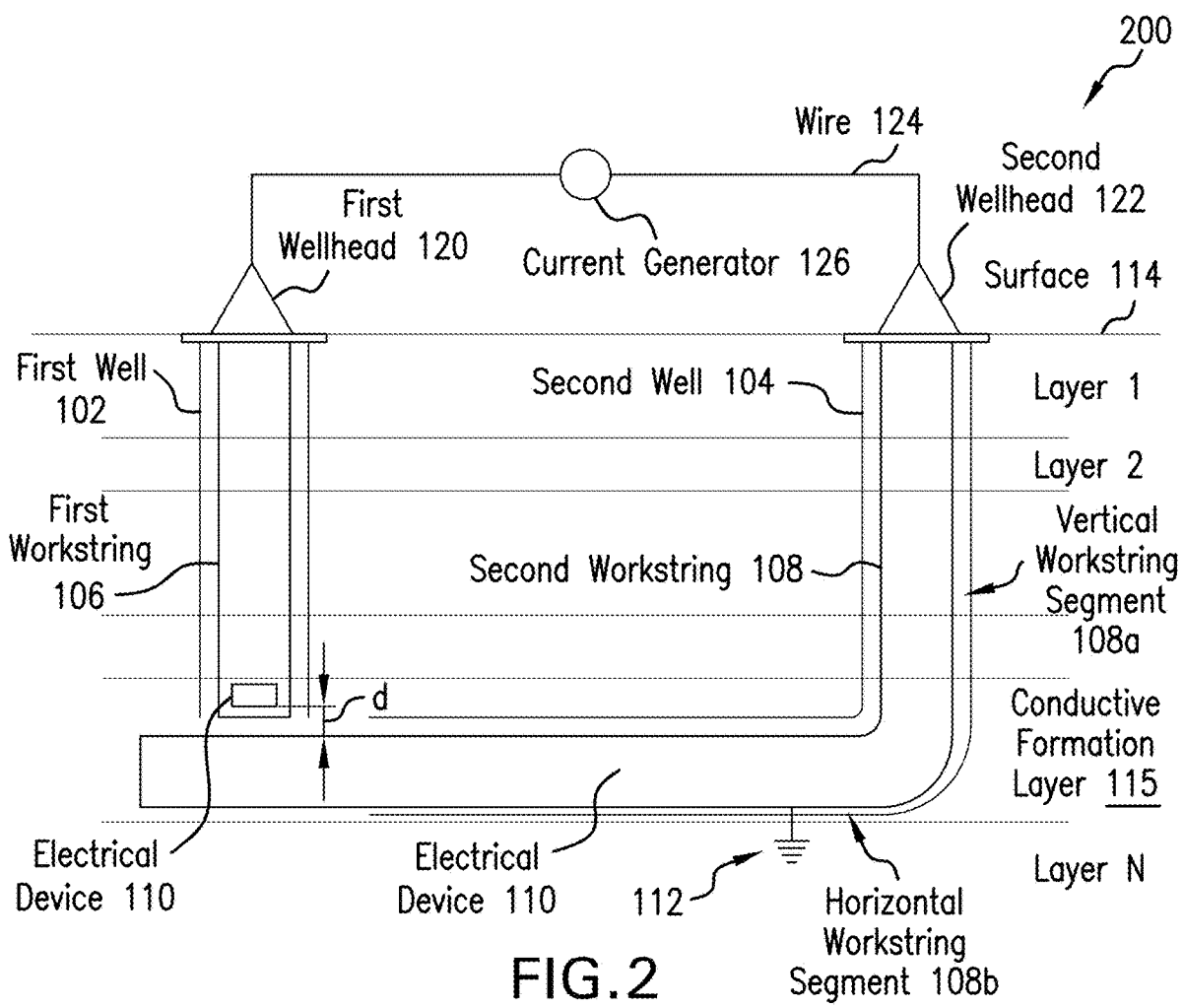
FIG. 2 shows a wellbore system in an alternate embodiment.
Figure 6:
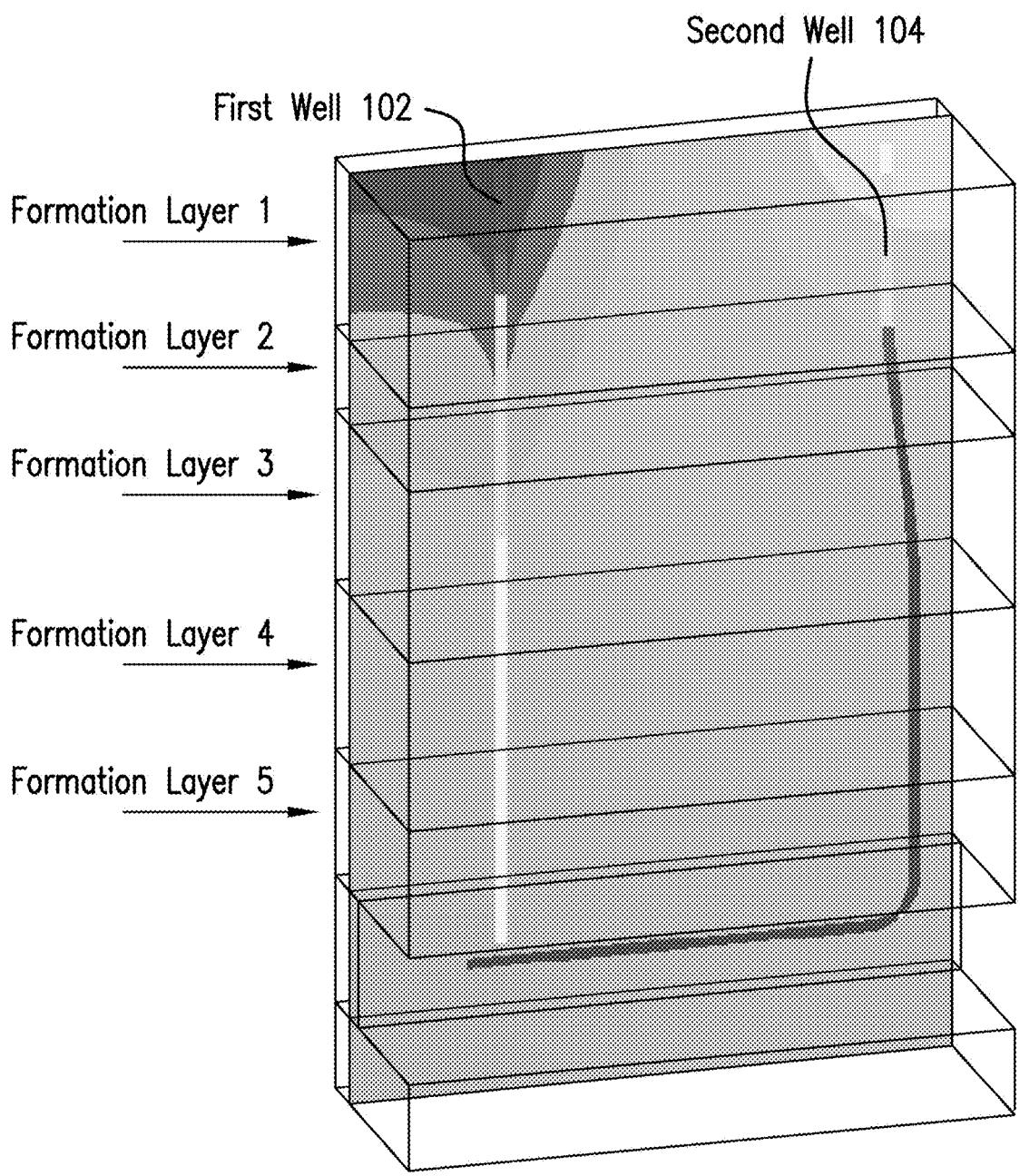
Figure 7:
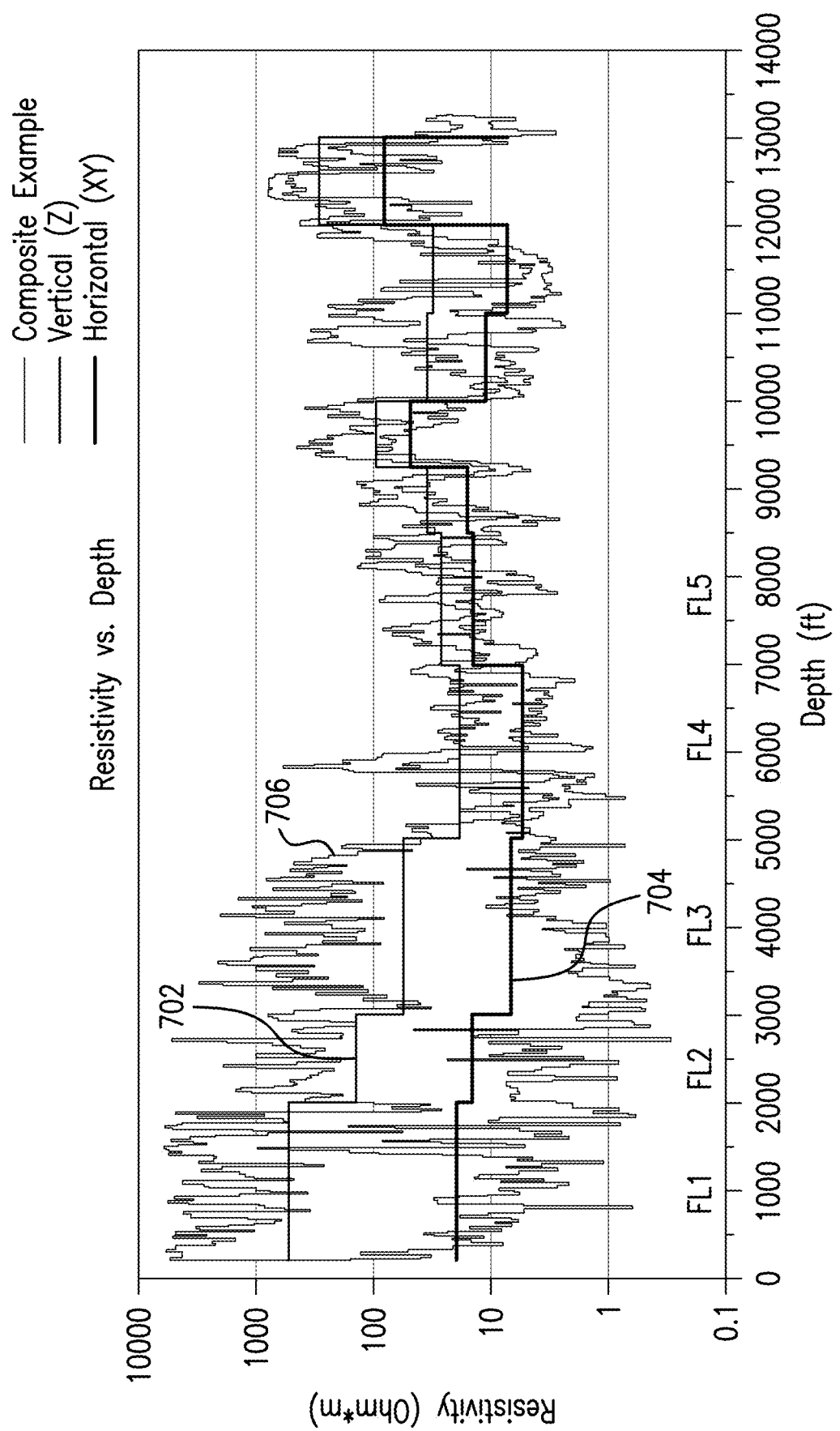
Figure 8:
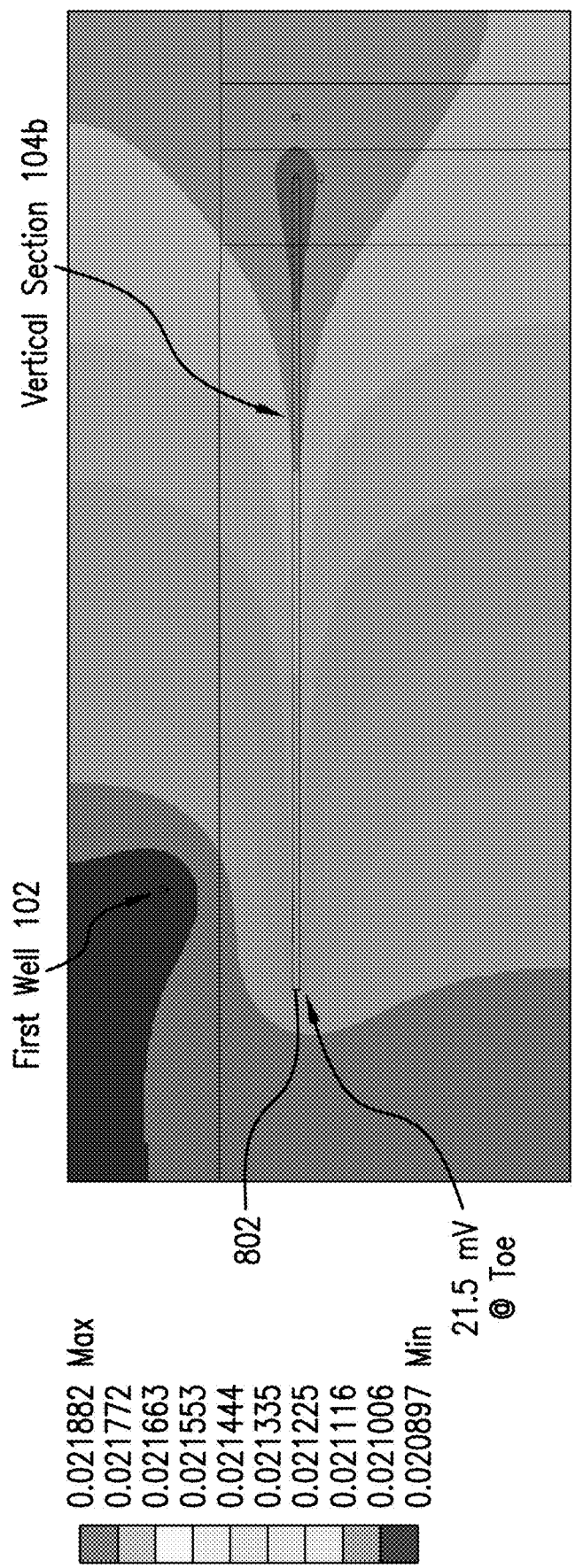
Figure 9:
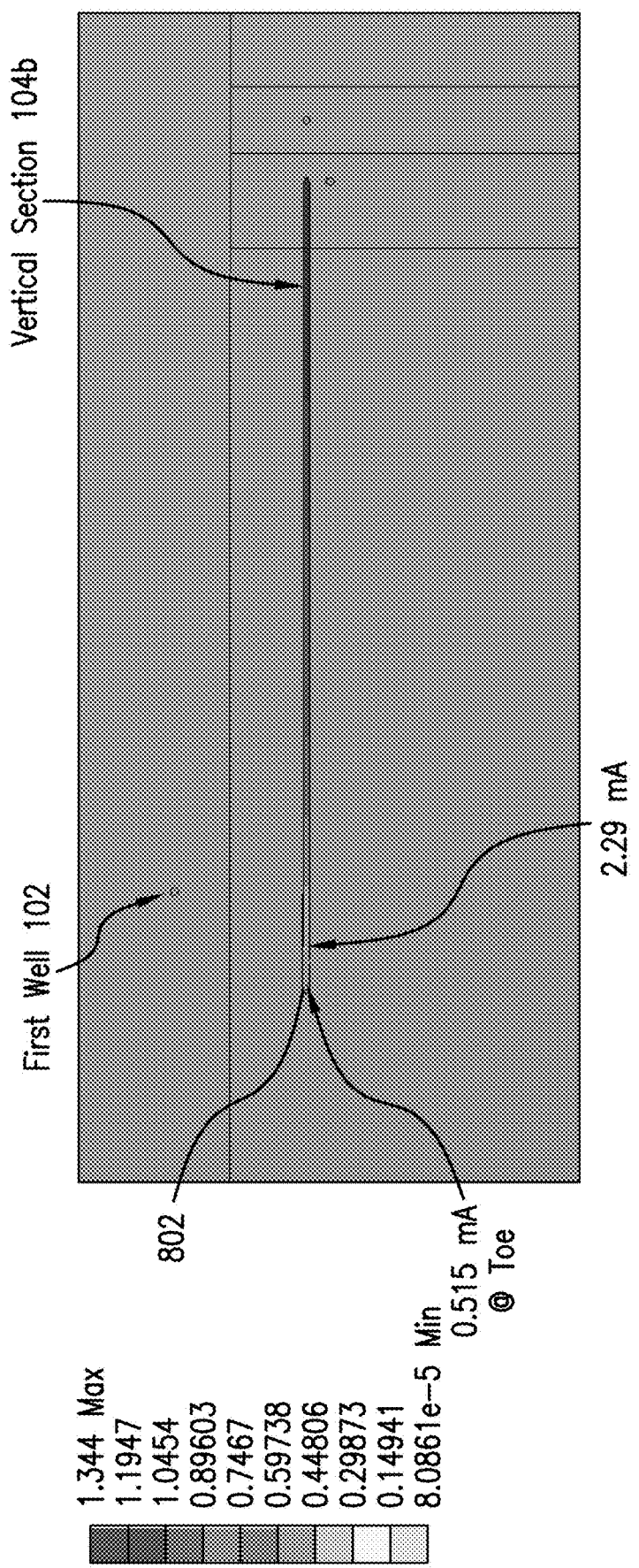
Figure 10:
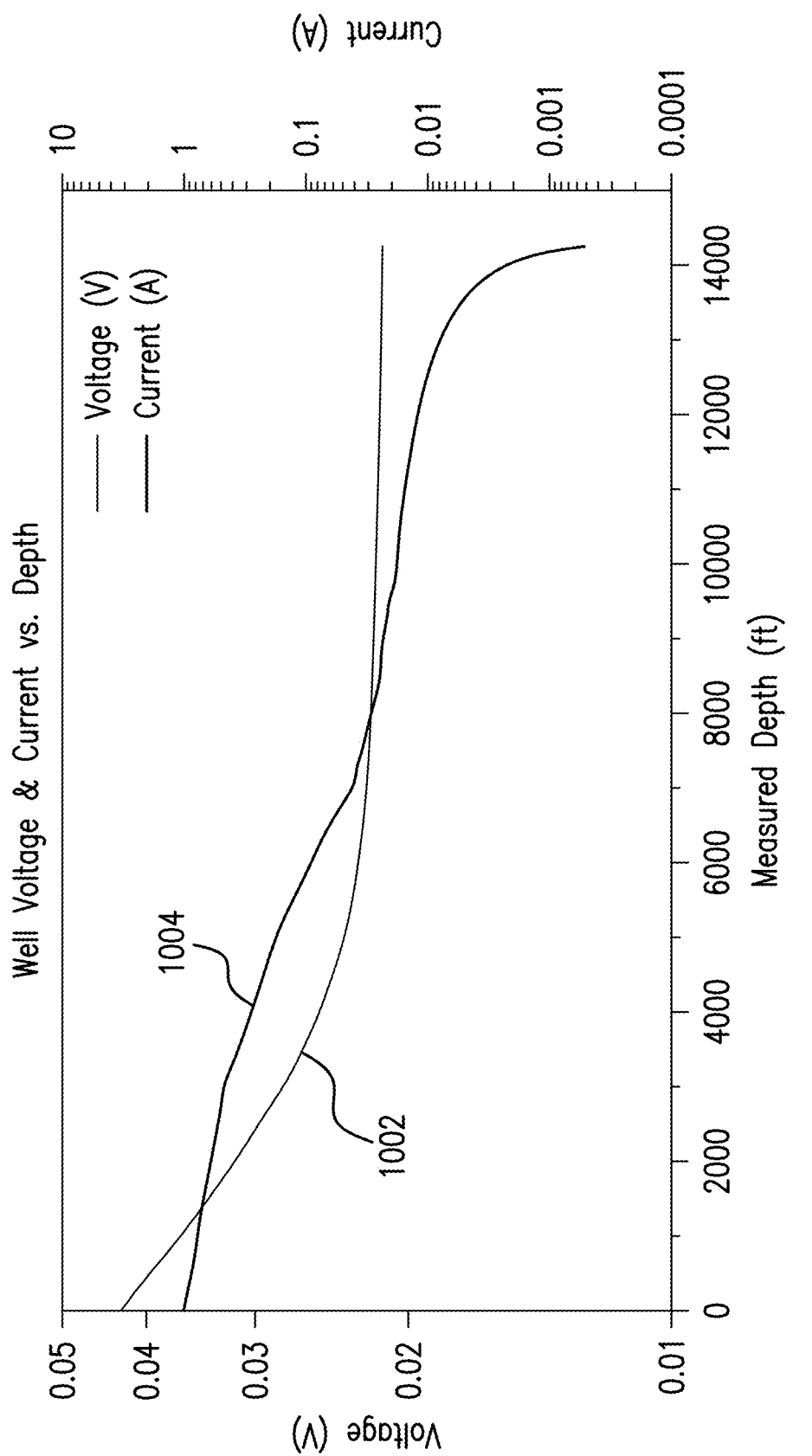
Figure 11:
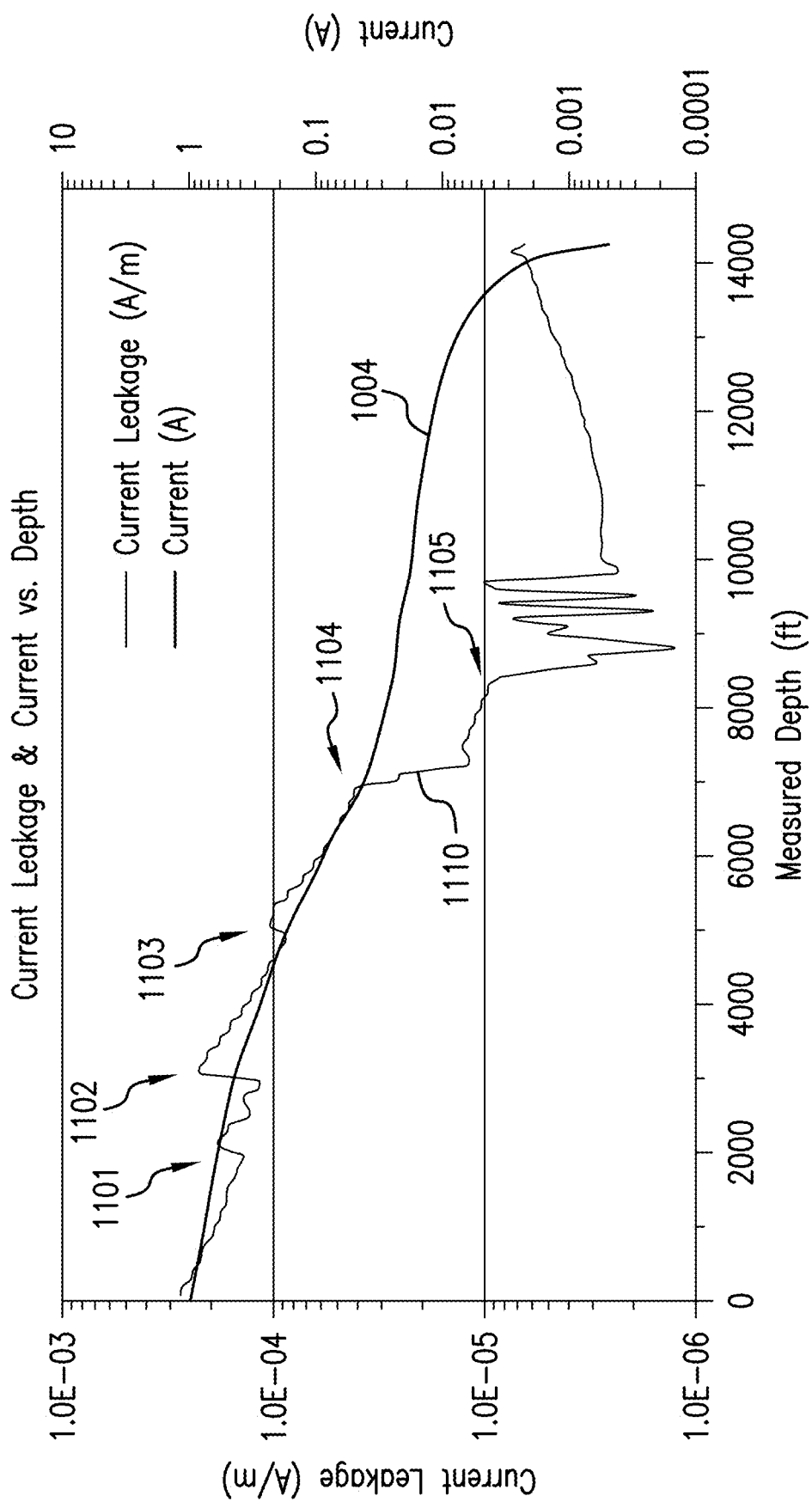
Figure 12:
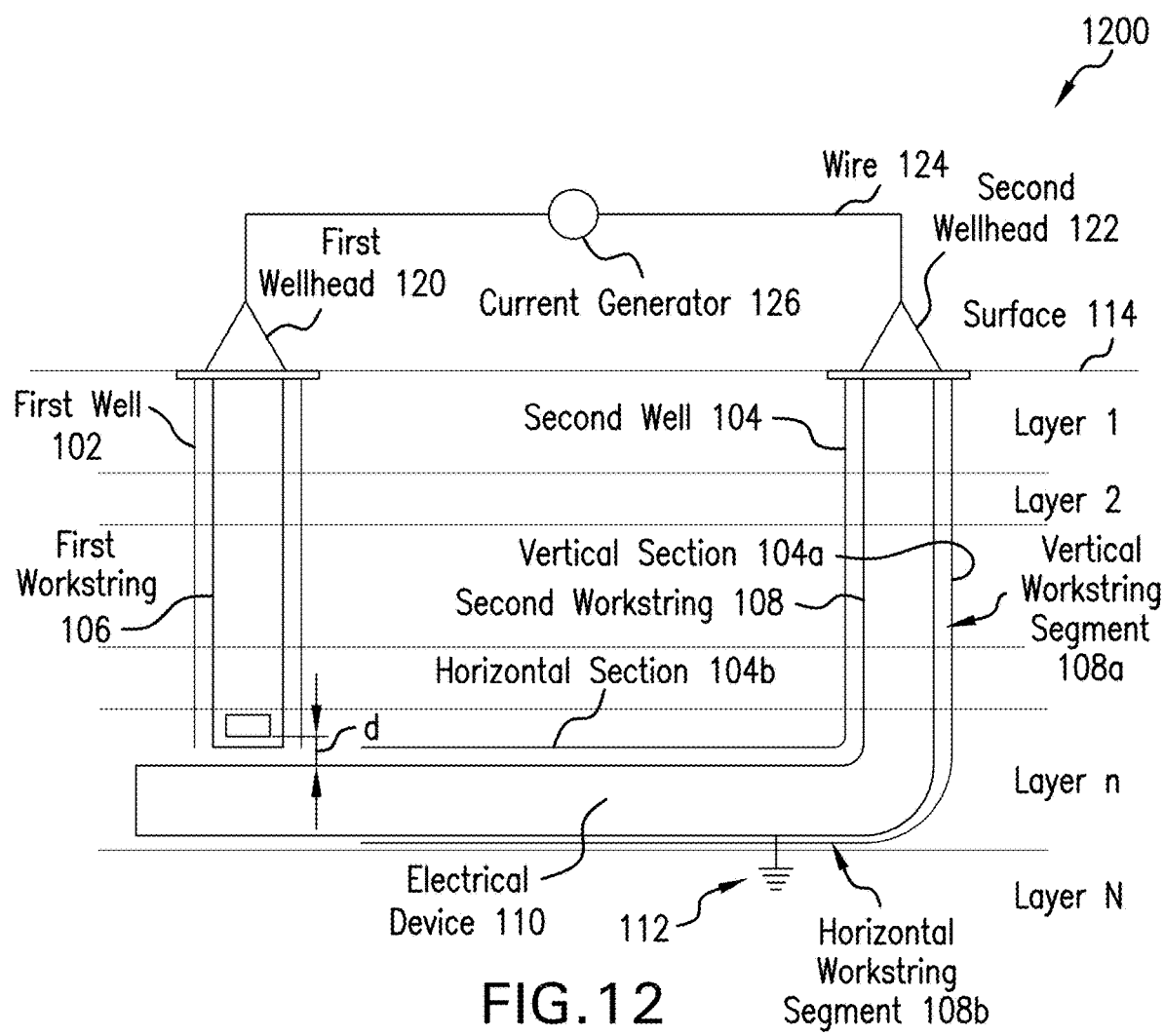
Figure 13:
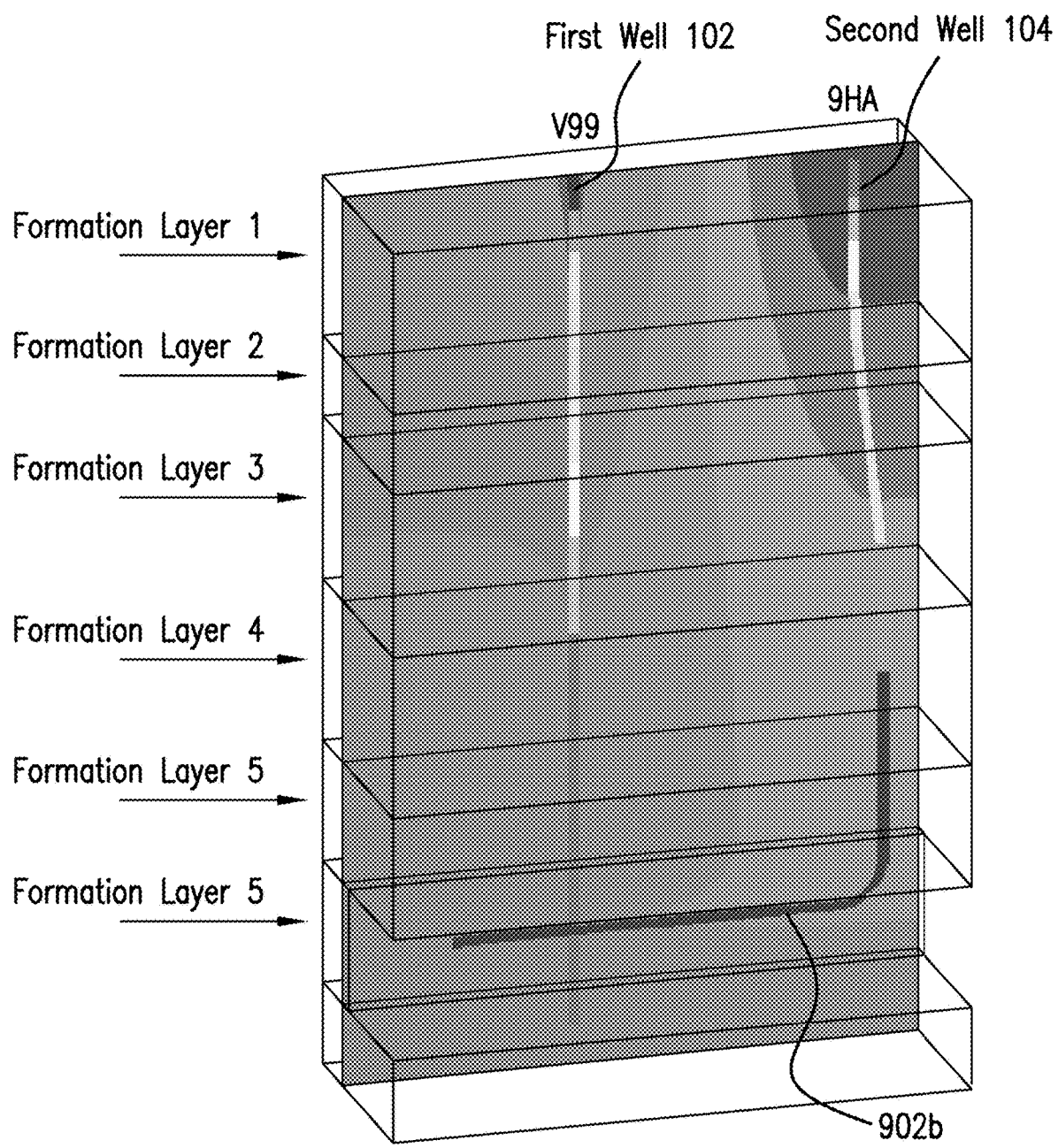
Figure 14:
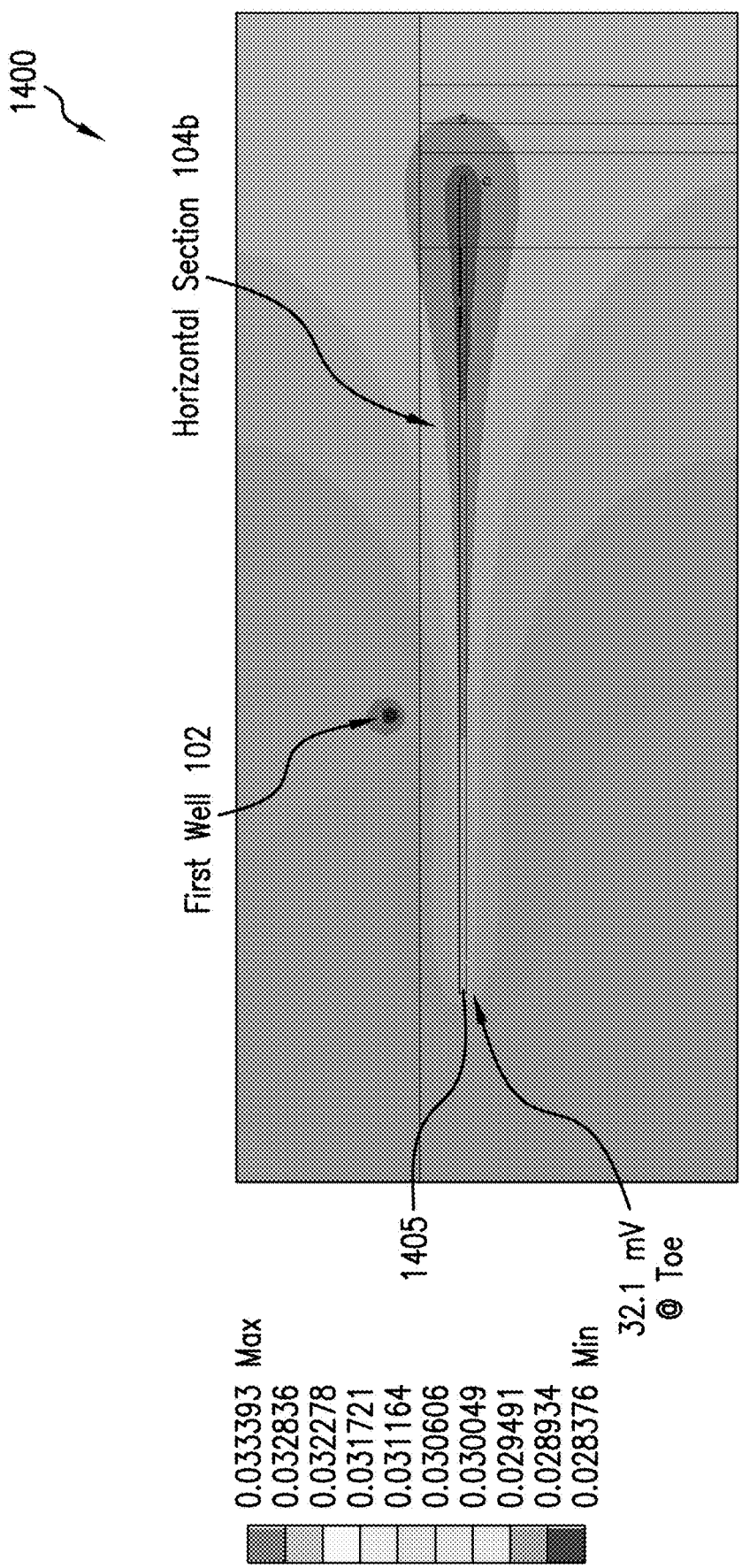
Figure 15:
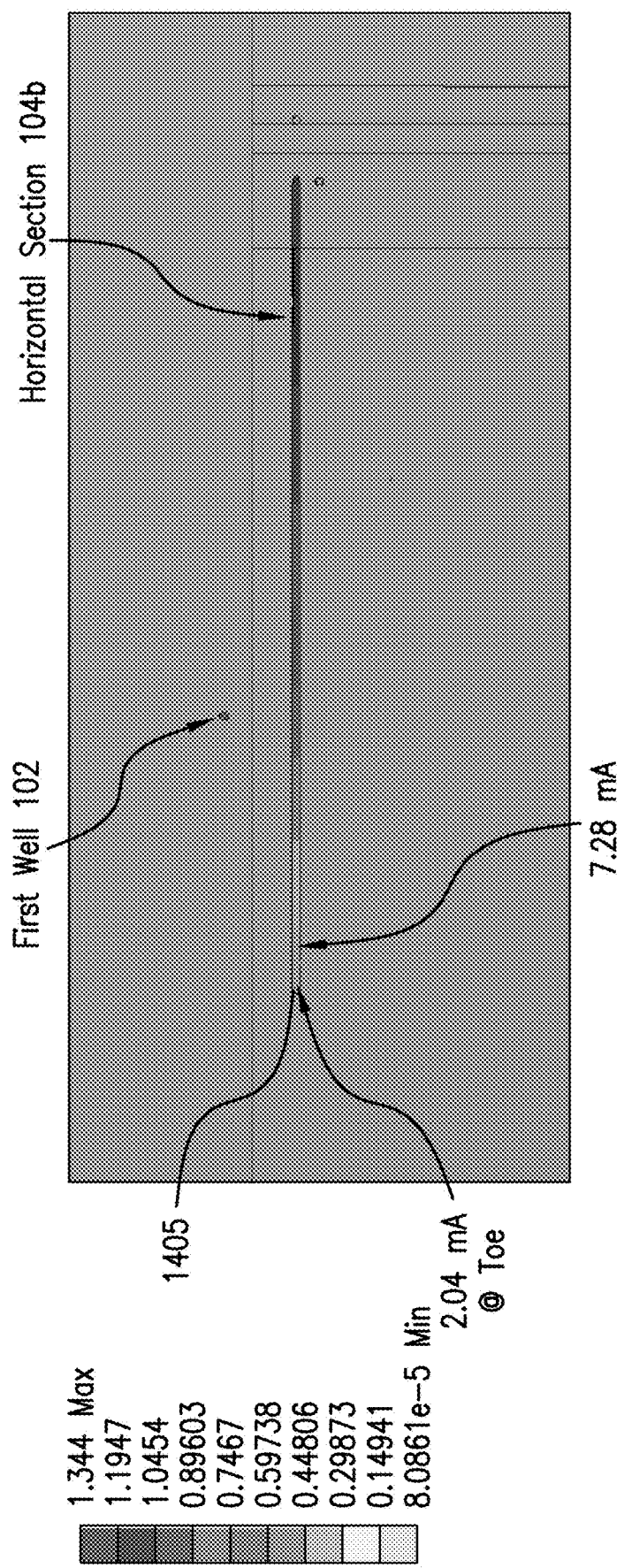
Figure 16:
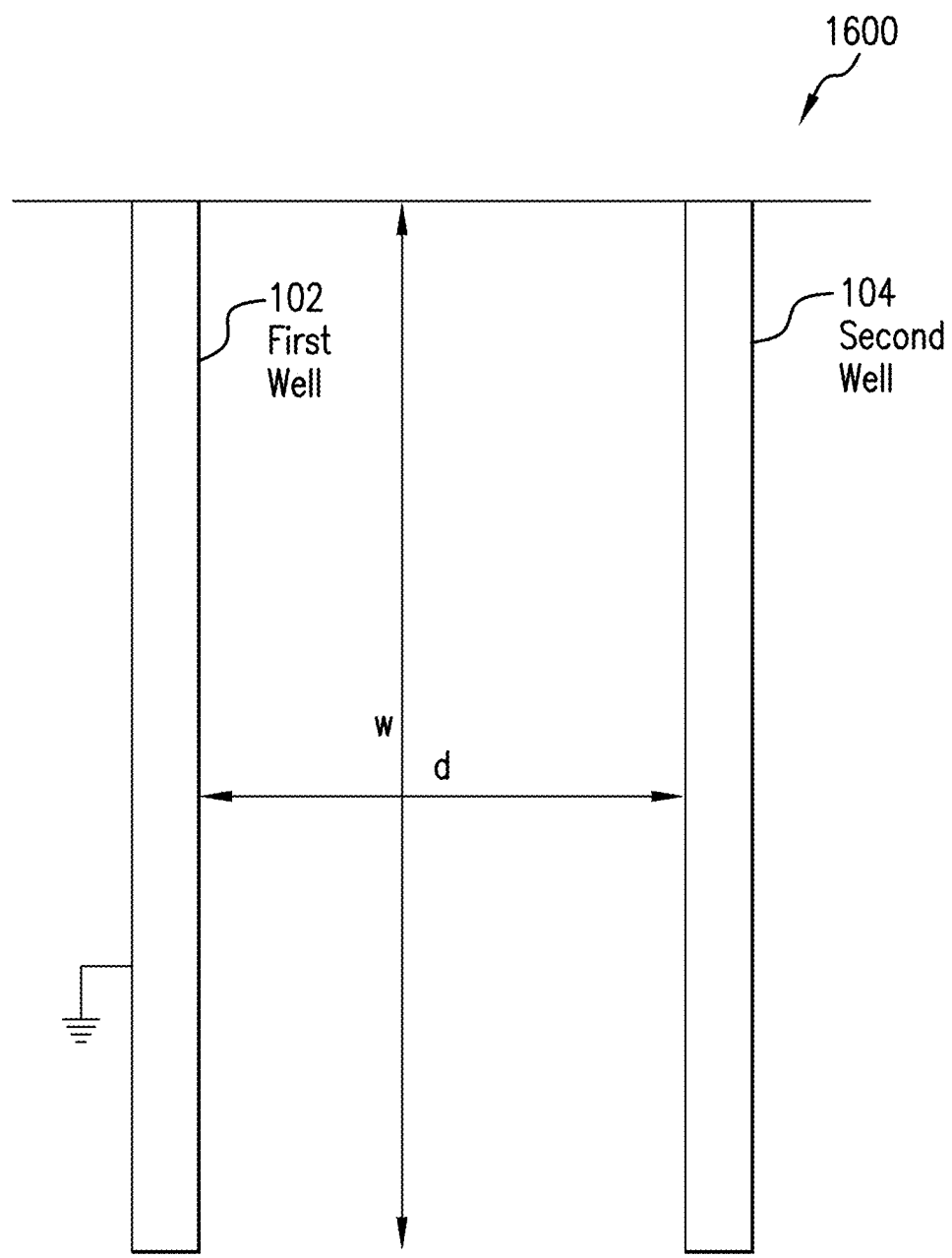
Figure 17:
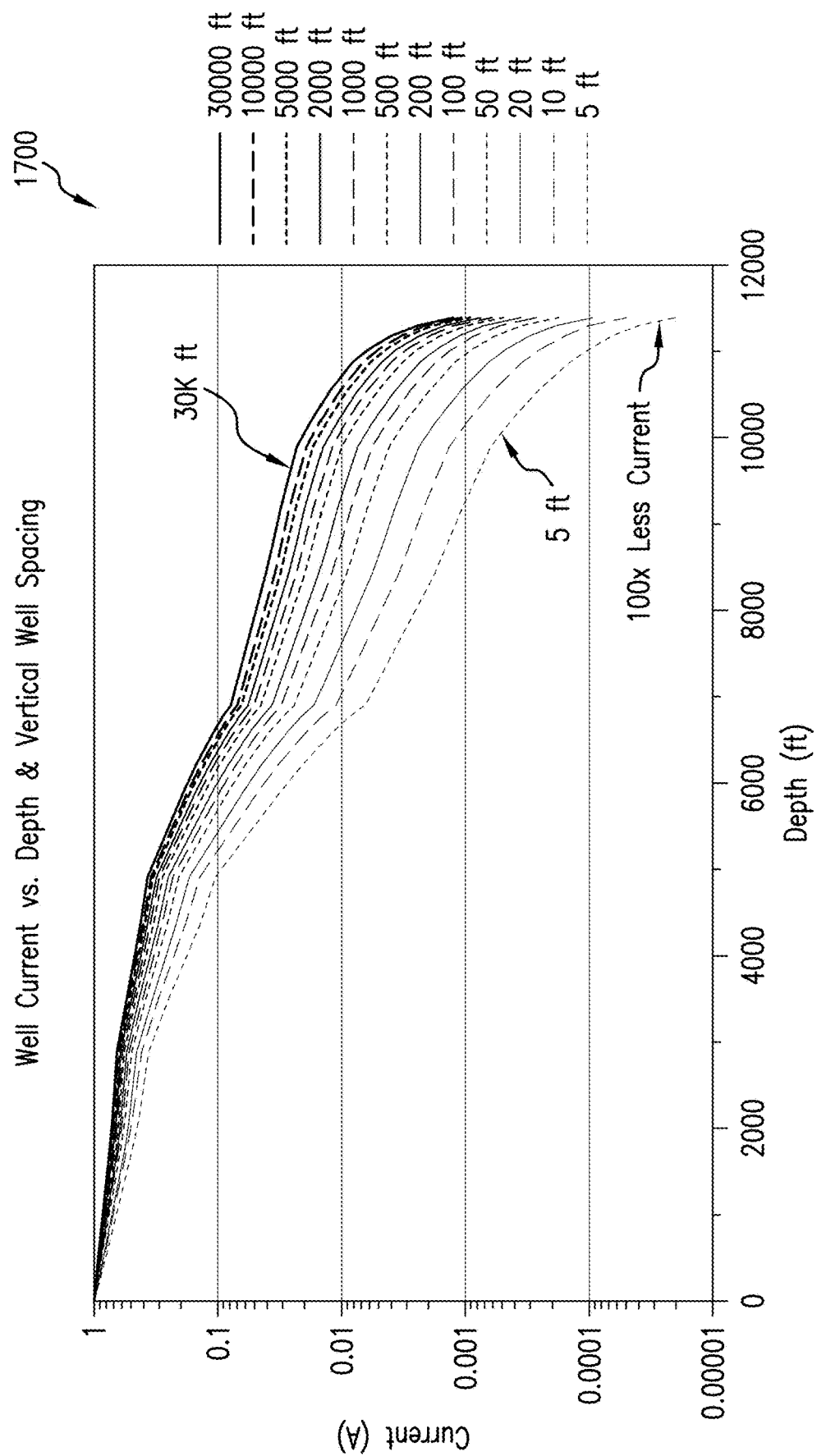
Figure 18:
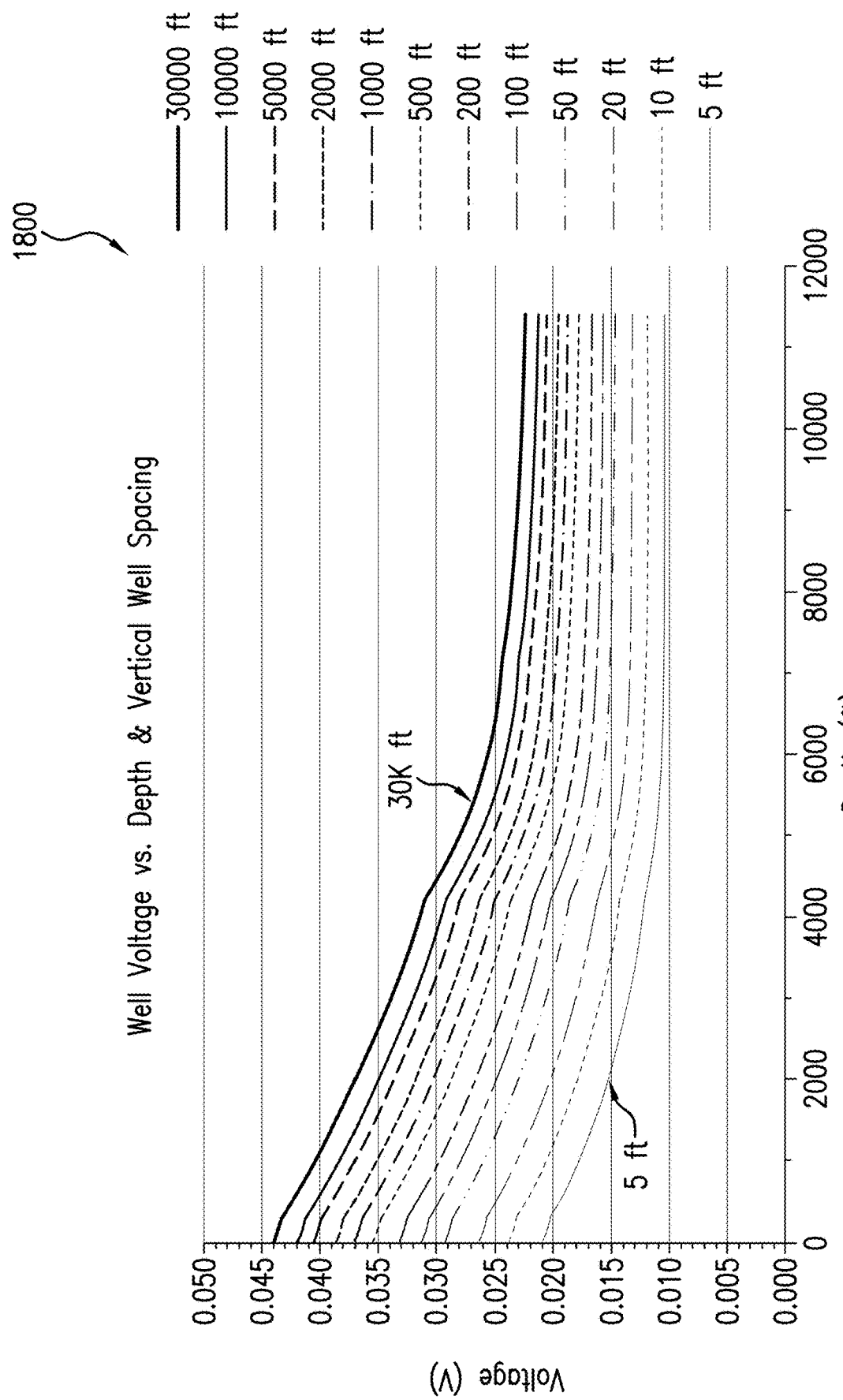
Figure 19:
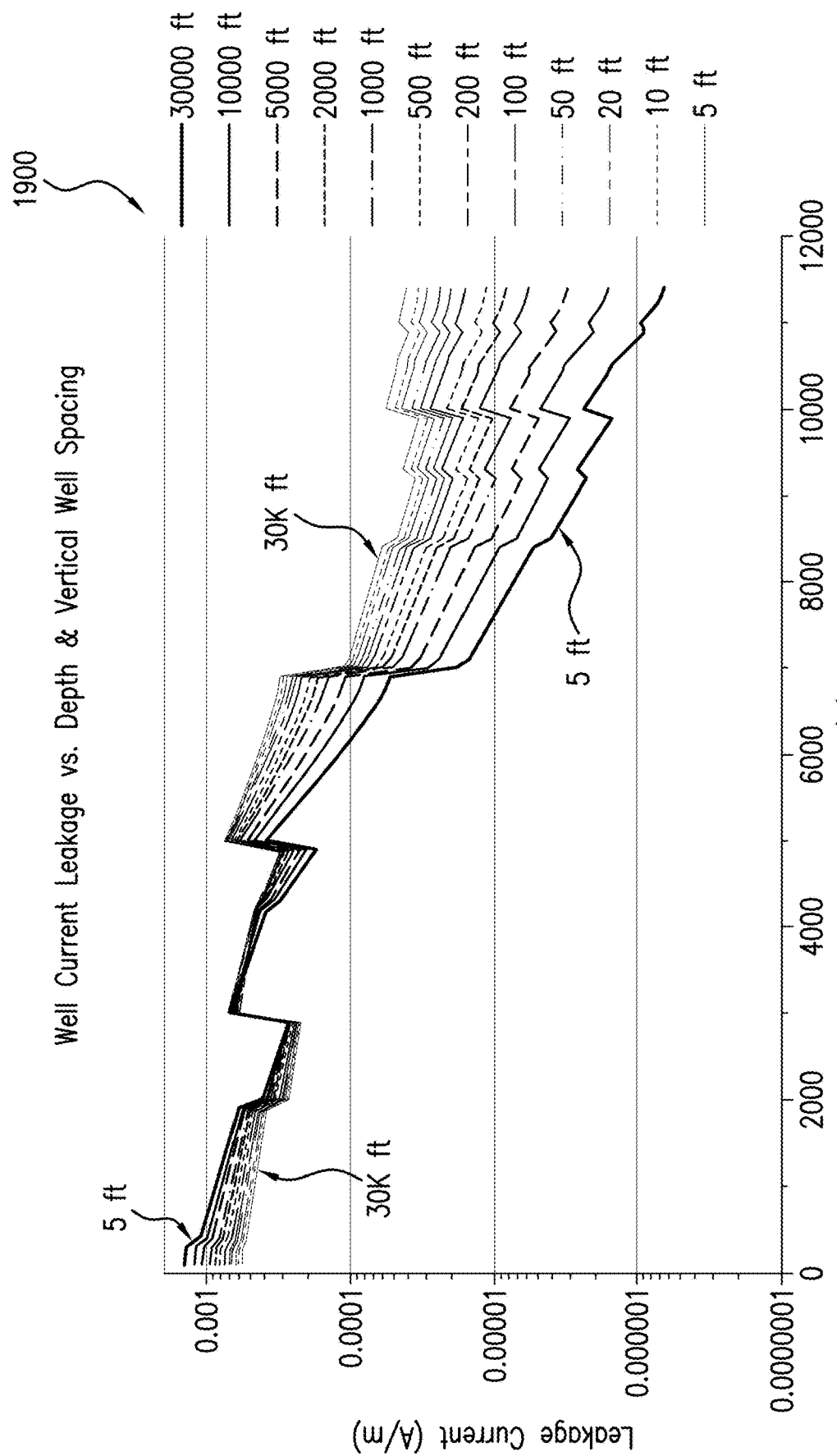
Figure 20:
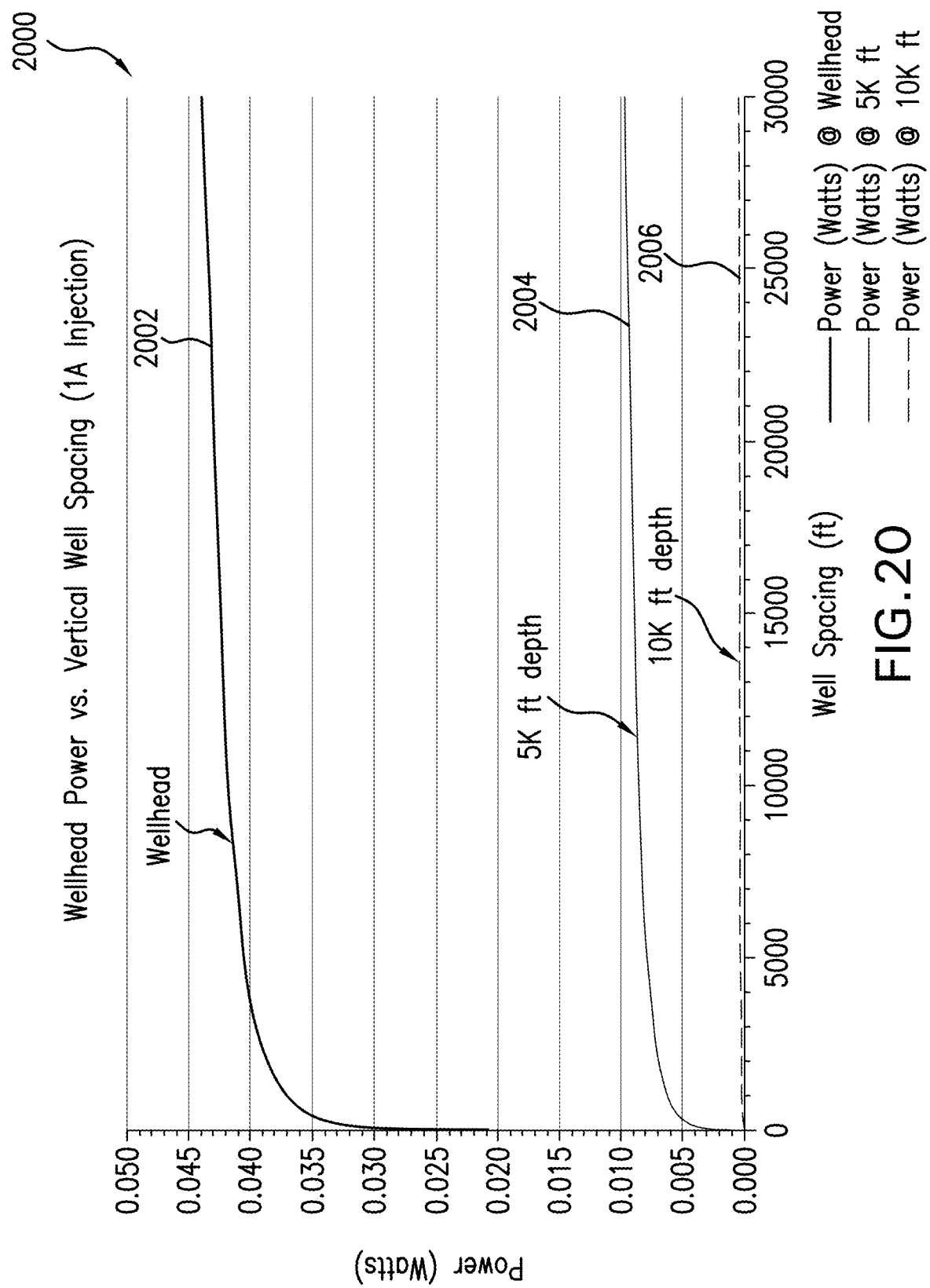
Figure 21:
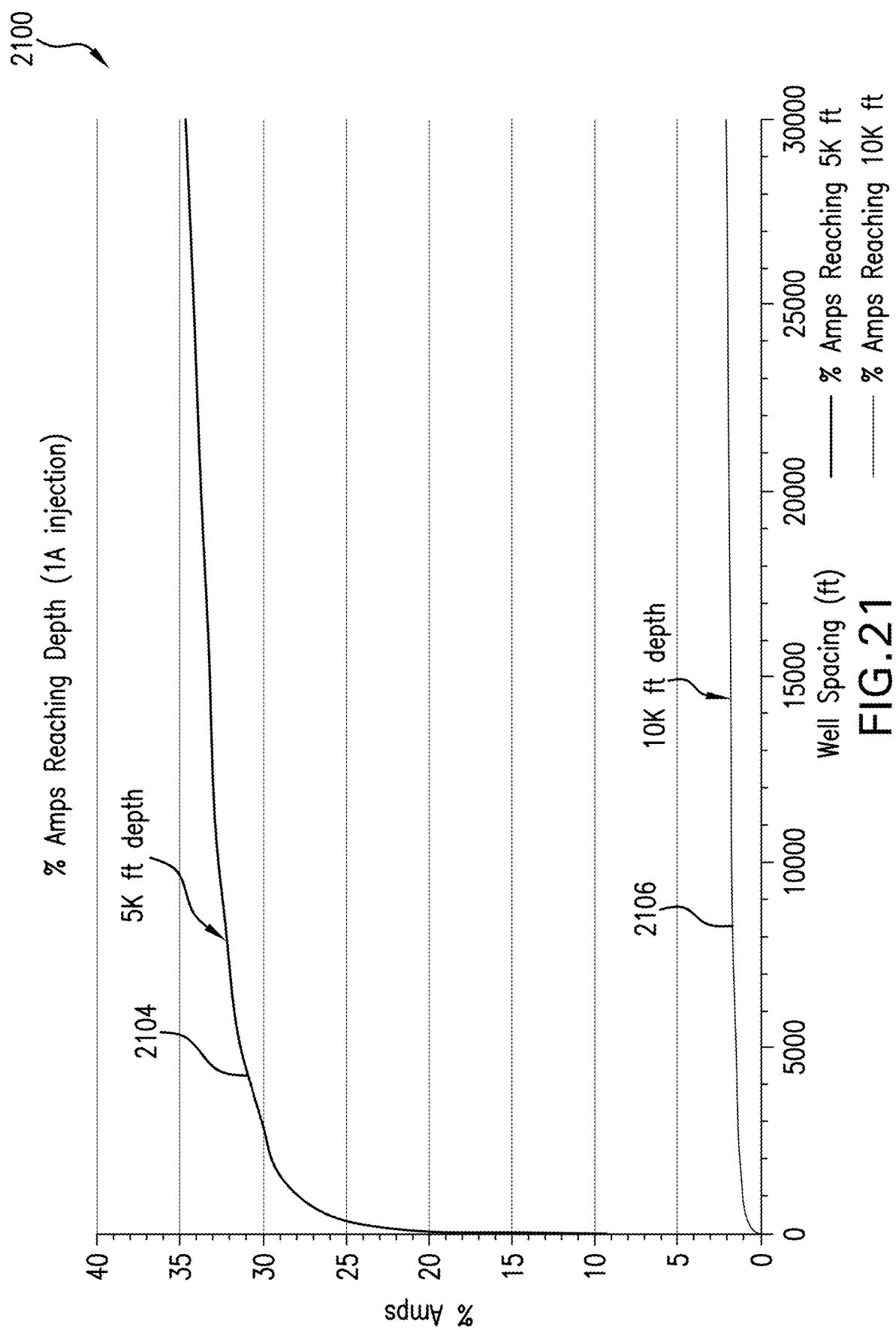
Figure 22:
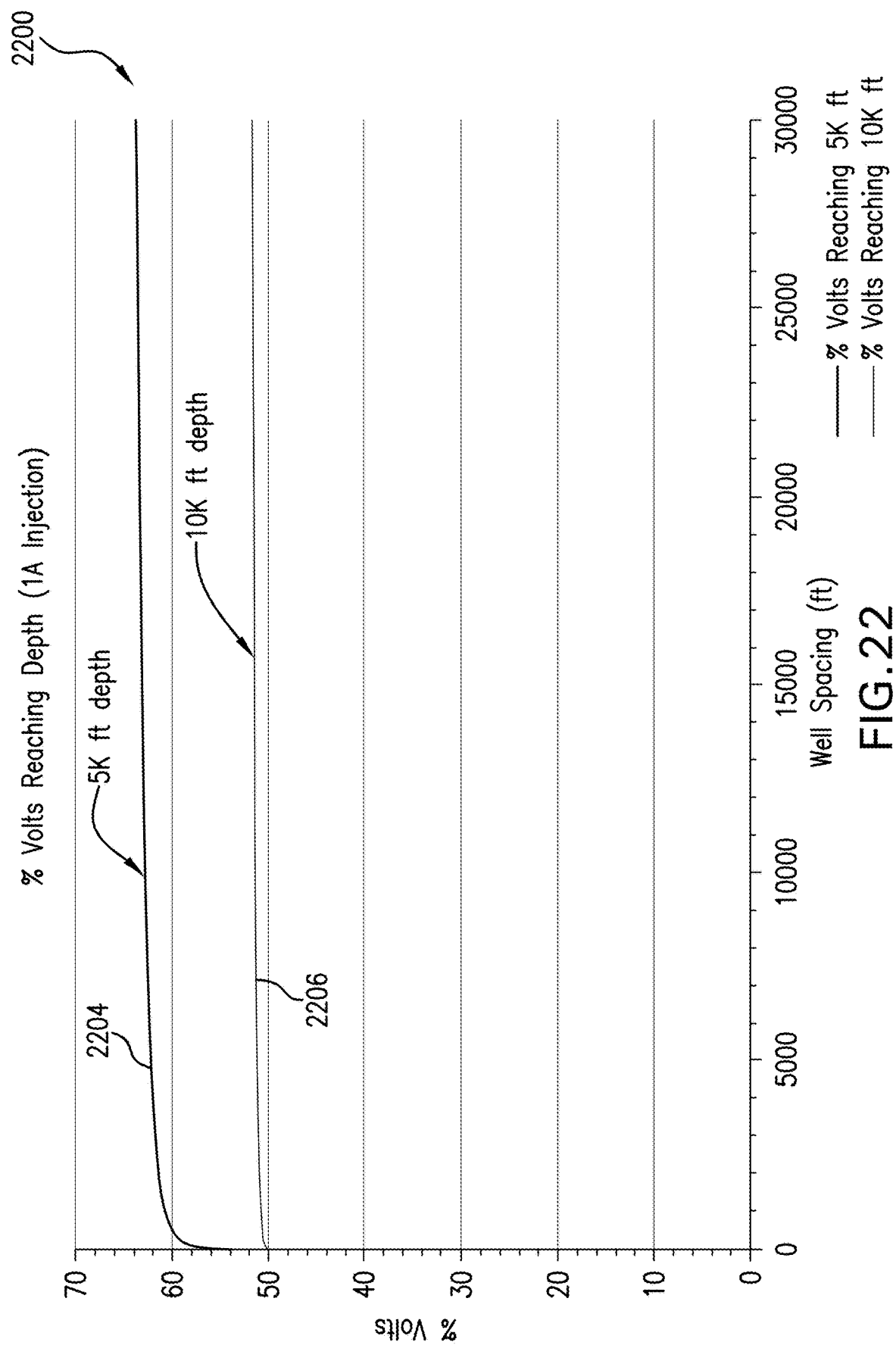
Figure 23:
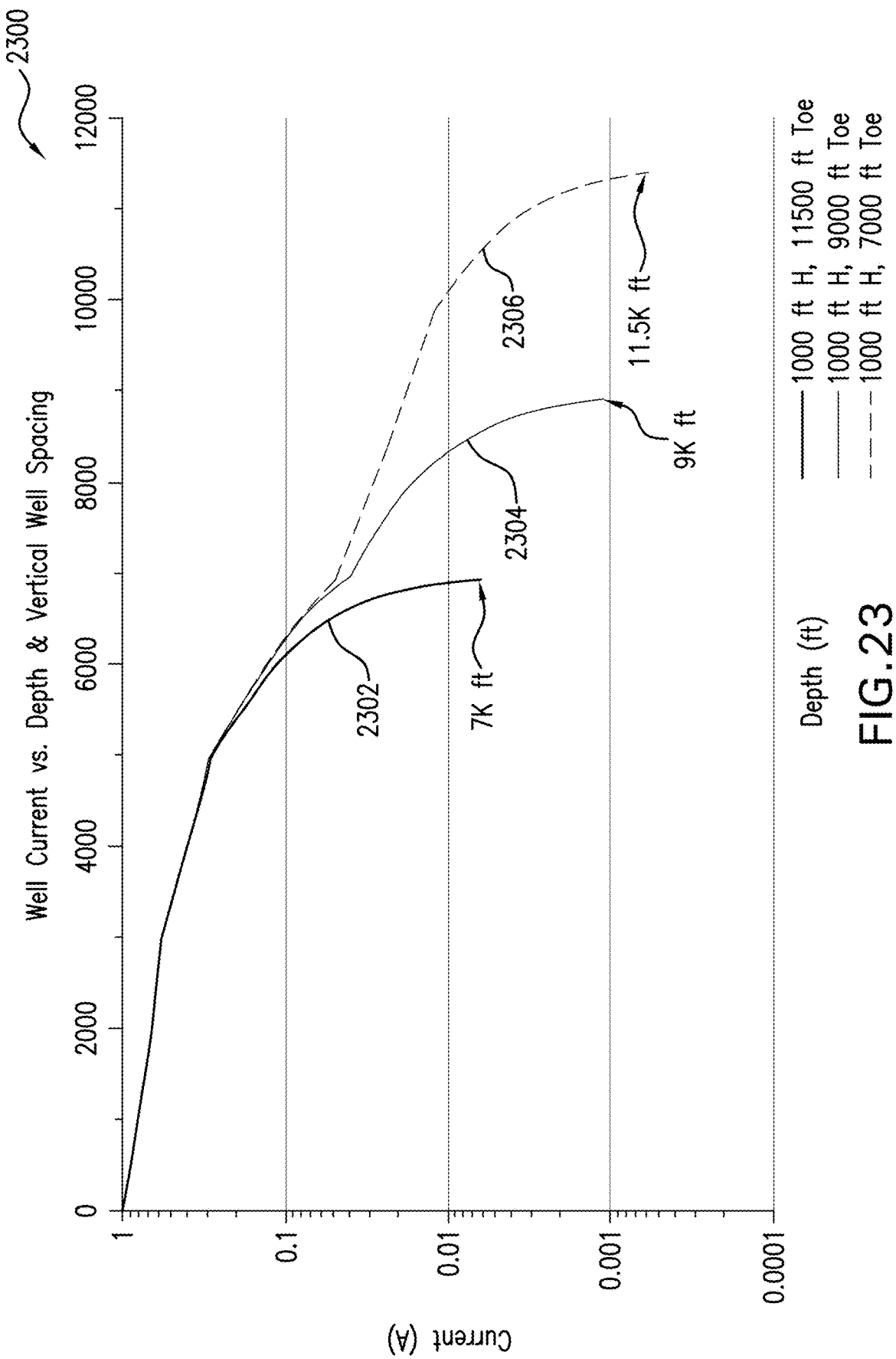
Figure 24:
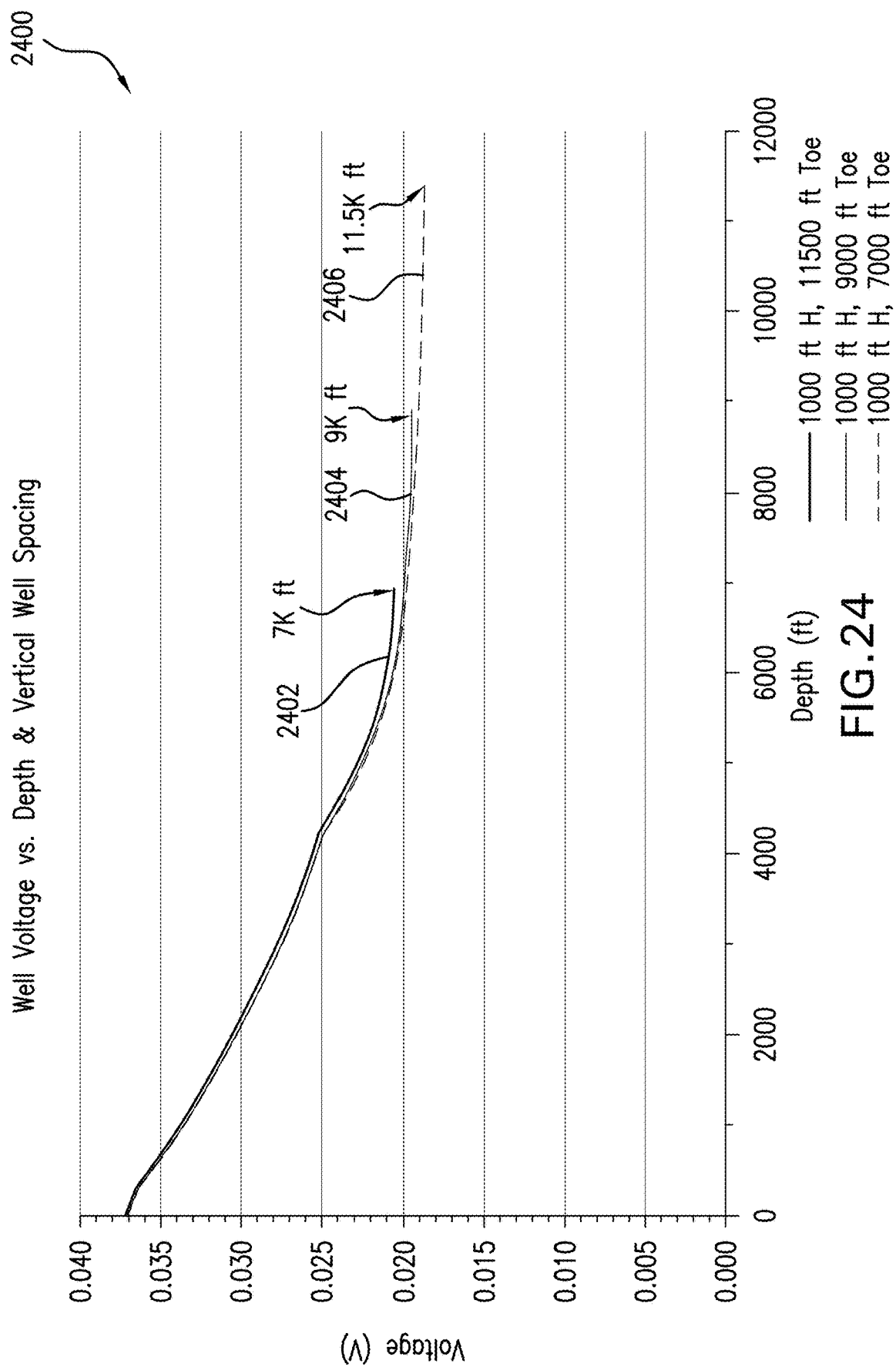
Figure 25:
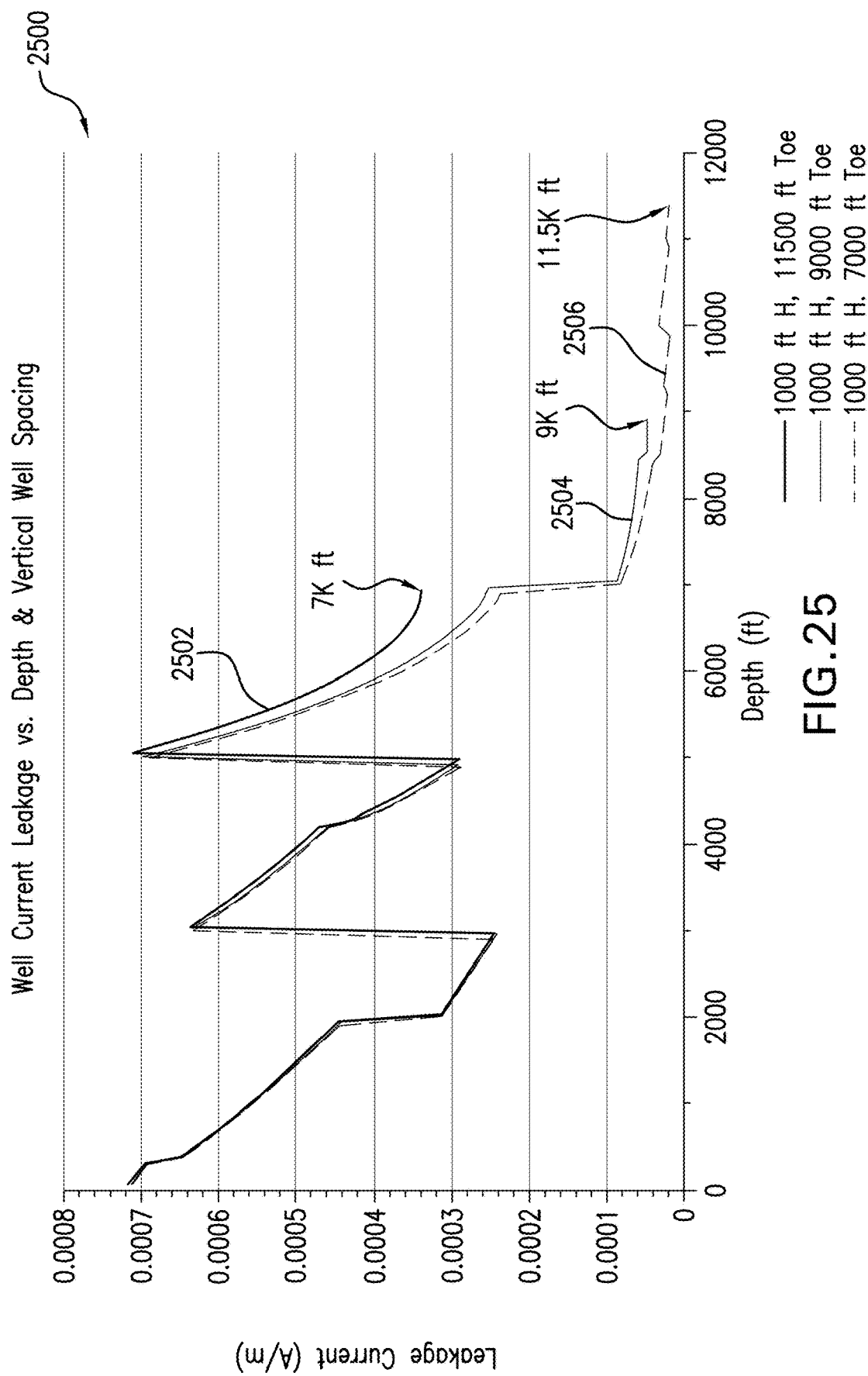
Figure 26:
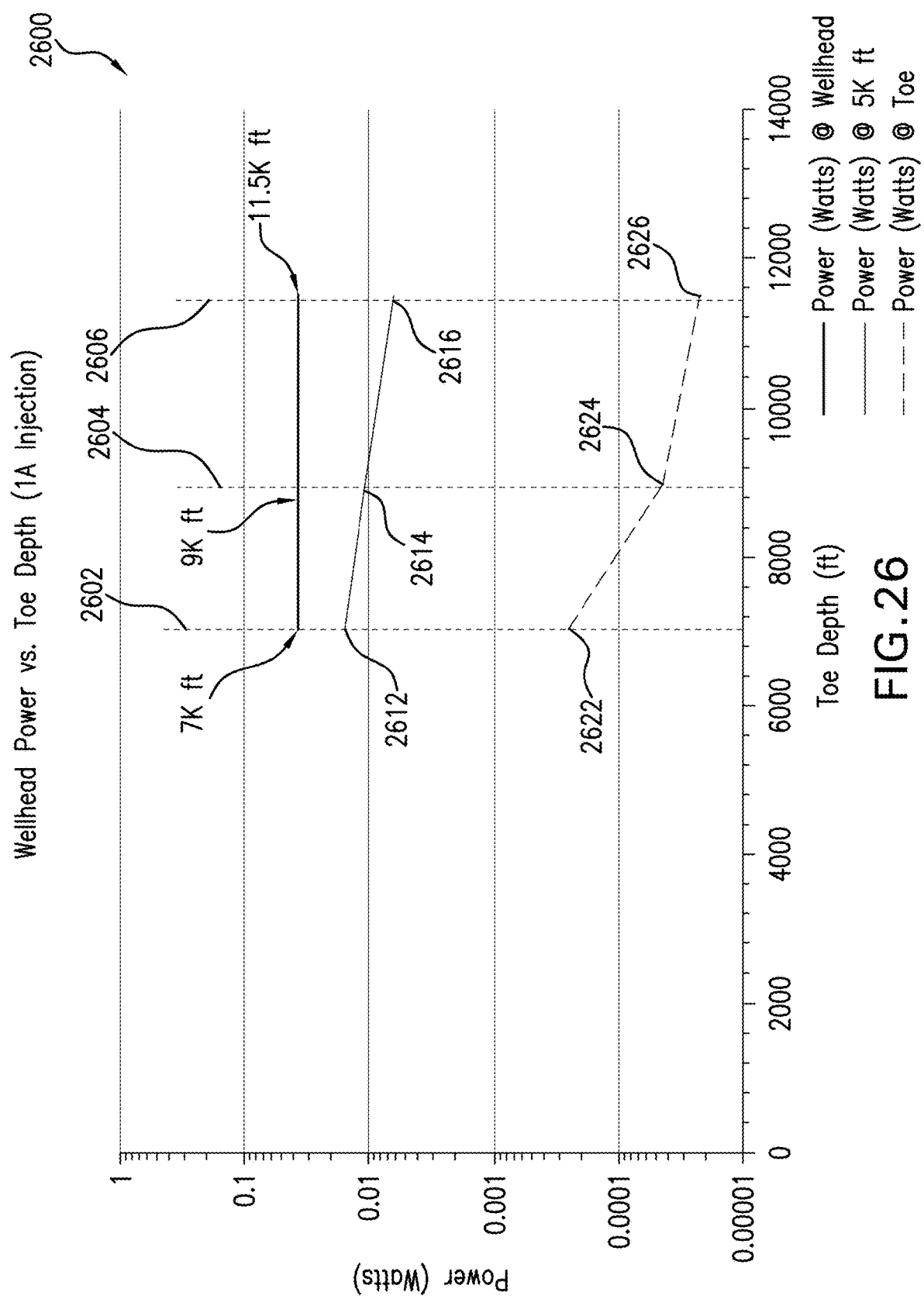
Figure 27:
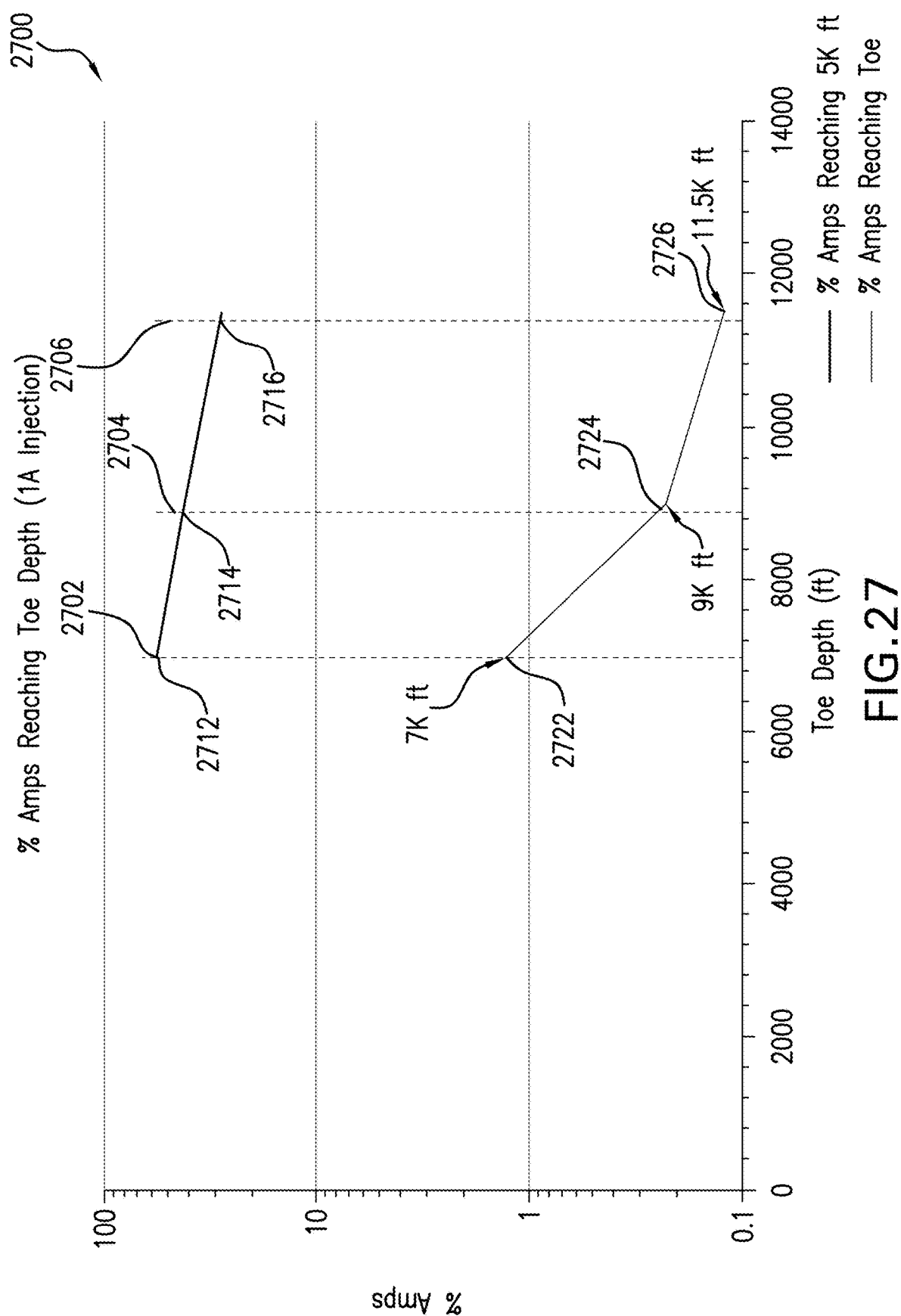
Figure 28:
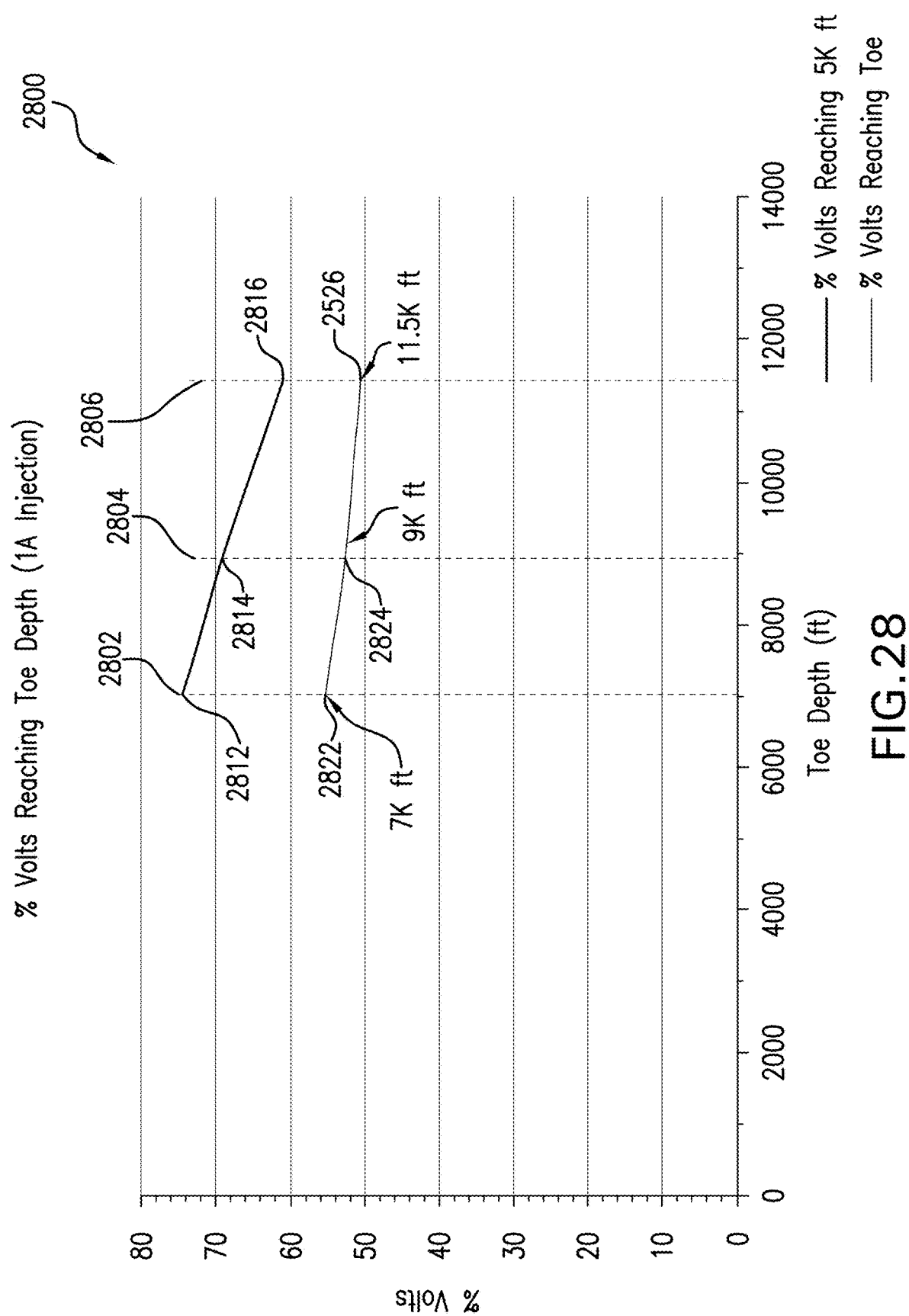

FIG. 6 shows the wellbore system of FIG. 2 illustrating the various formation layers that the first well and the second well pass through;

FIG. 7 shows a relation of resistivity vs. depth for the illustrative wellbore system of FIG. 2;

FIG. 8 shows a top-down view of the well system of FIG. 2 showing, in particular, a voltage distribution along the horizontal section;

FIG. 9 shows a top-down view of the well system of FIG. 2, showing a current density distribution along the horizontal section;

FIG. 10 shows a relation of voltage and current to total wellbore depth for the well system of FIG. 2;

FIG. 11 shows a relation of current and leakage current to depth for the well system of FIG. 2;

FIG. 12 shows a wellbore system in another alternate embodiment;

FIG. 13 shows the well system of FIG. 12 illustrating the various formation layers that the first well and the second well pass through;

FIG. 14 shows a top-down view of the wellbore system of FIG. 12, showing a voltage distribution along the horizontal work string segment of the second work string;

FIG. 15 shows a top-down view of the wellbore system of FIG. 12 showing a current density distribution along the horizontal section;

FIG. 16 shows a simulated well system for determining the effect of wellbore spacing on the electrical parameters of a circuit including a first well and a second well as well as the effect of wellbore depth on the electrical parameters;

FIG. 17 shows a relation between well current and depth for a plurality of well spacings w between the first well and the second well;

FIG. 18 shows a relation between well voltage and depth for the plurality of well spacings of FIG. 17;

FIG. 19 shows a relation between well current leakage and depth for the plurality of well spacings of FIG. 17;

FIG. 18 shows a relation between power and well spacing for selected wellbore depths;

FIG. 19 shows a relation between amperage and well spacings for selected wellbore depths;

FIG. 20 shows a relation between percent voltage and well spacing for selected wellbore depths;

FIG. 23 shows a relation of well current vs. depth for the three illustrative well depths;

FIG. 24 shows a relation of voltage vs. depth for the three illustrative well depths;

FIG. 25 shows a relation of current leakage vs. depth for the three illustrative well depths;

FIG. 26 shows a relation between power and toe depth for the three illustrative well depths;

FIG. 27 shows a relation between percent amperage and toe depth for the three illustrative well depths; and FIG. 28 shows a relation between percent voltage and toe depth for the three illustrative well depths.

DETAILED DESCRIPTION

A detailed description of one or more embodiments of the disclosed apparatus and method are presented herein by way of exemplification and not limitation with reference to the Figures.

Figure 1:
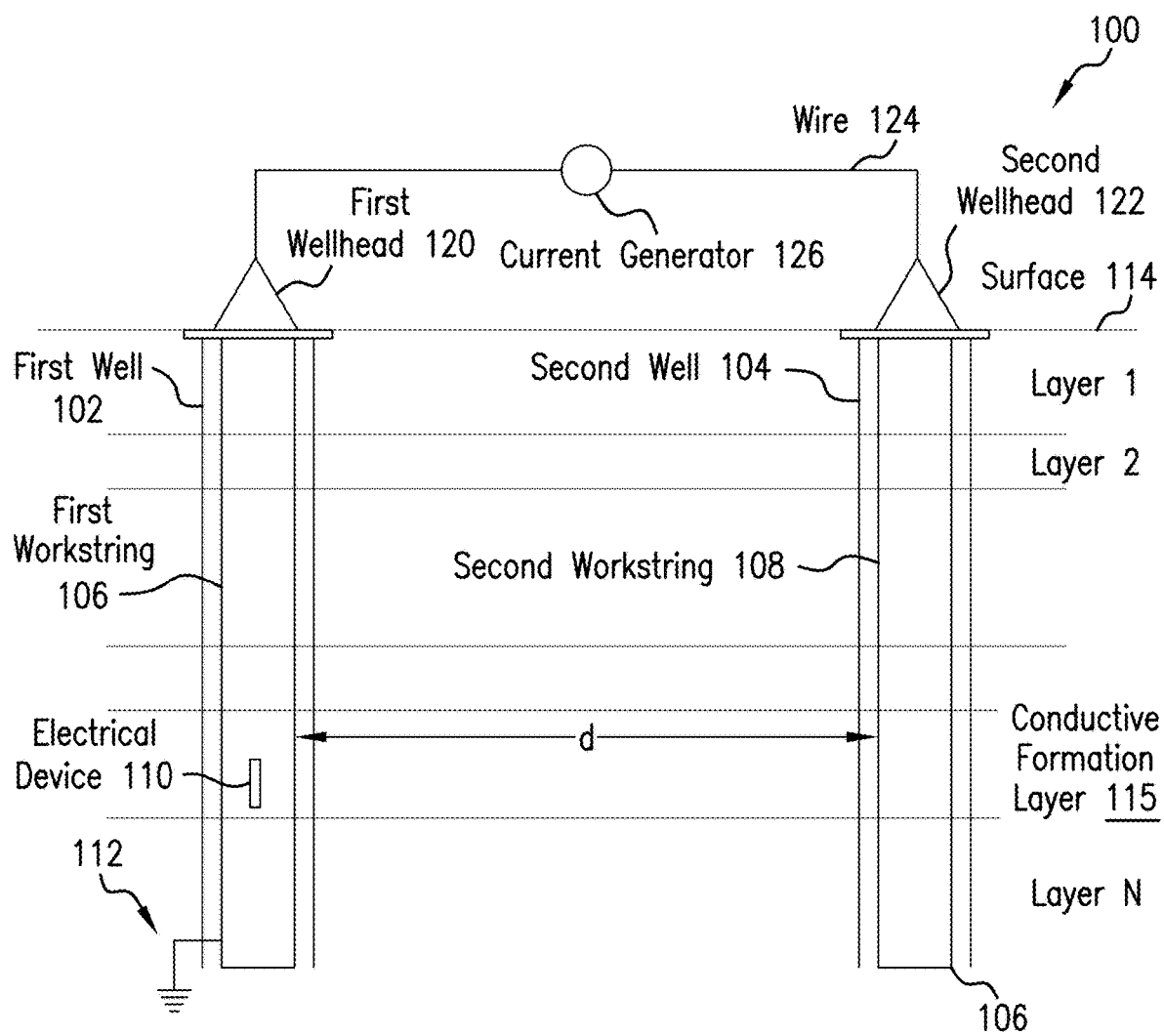
FIG. 1 shows an illustrative wellbore system for electrically operating a downhole device in an embodiment.

Referring to FIG. 1, a wellbore system 100 for electrically operating a downhole device is illustrated in an embodiment. The wellbore system 100 includes a first well 102 and a second well 104. In the illustrative embodiment, the first well 102 is a vertical well and the second well 104 is a vertical well. In various embodiments, the first well 102 extends to through a plurality of formations, labelled Layer 1, . . . Layer N. The second well 104 also extends through the plurality of formations. However, in various embodiments, the first well and the second well need only extend to a layer selected from the plurality of layers based on its conductivity. For illustrative purposes, the conductive formation layer 115 in FIG. 1 represents a formation layer having a highest electrical conductivity from among the plurality of layers. A resistivity or conductivity of the formation layers can be determined by running an resistivity logging tool through one of the first well 102 and second well 104.

The first well 102 includes an electrically conductive element, such as first work string 106, that runs through some or all of the plurality of layers, and at least to the selected Layer n. Similarly, the second well 104 includes an electrically conductive element, such as second work string 108, that through some or all of the plurality of layers, and at least to the conductive formation layer 115. The first well 102 and the second well 104 can be uncased wells. Alternatively, the first well 102 and the second well 104 are uncased at a depth of the conductive formation layer 115. The first well 102 further includes an electrical device 110 at a downhole location. The electrical device 110 is operable when electricity or an electrical current is applied to it. In various embodiments, the electrical device 110 can be a frac sleeve, trigger sleeve or a liner hanger or any other electrical device.

A first wellhead 120 is located at the surface 114 at a top of the first well 102. The first wellhead 120, or a component thereof, is electrically conductive and is electrically coupled to the first work string 106. The second well 104 includes a second wellhead 122 located at the surface at a top of the second well 104. The second wellhead 122, or a component thereof, is electrically conductive and is electrically coupled to the second work string 108. The second well 104 is separated from the first well 102 by a selected horizontal spacing, labelled 'd'. The second work string 108 can be electrically grounded.

A wire 124 or conductive element electrically couples the first wellhead 120 to the second wellhead 122. The wire 124 runs along the surface 114 between the first wellhead 120 and the second wellhead 122. A current generator 126 is disposed at a location along the wire 124 between the first wellhead 120 and the second wellhead 122. An electrical circuit is therefore formed that includes the first wellhead 120, the first well 102, the conductive formation layer 115 between the first well 102 and second well 104, the second well 104, the second wellhead 122 and wire 124.

In order to operate the electrical device 110 at the downhole location, the wire 124 is connected between the first wellhead 120 and the second wellhead 122 and the current generator 126 is coupled to the wire 124. With the second well work string 108 grounded, the current generator 126 injects a selected current (e.g., 1 amp) into the second well 104 via the second wellhead 122. The injected current is conducted downhole via the second work string 108 and travels from the second well 104 to the first well 102 through the conductive formation layer 115. The current then travels ups the first work string 106 to the surface 114 in order to complete the circuit. The current received at the first work string 106 is used to power the electrical device 110, thereby providing an operating current sufficient to cause activation and/or operation of the electrical device 110.

It is noted that each formation layer has its own conductivity or resistivity. Depending on the formation, there can be more than one formation layer through which current can pass from the second work string 108 to the first work string 106. In alternate embodiments, the electrical device 110 can reside on the second work string 108 and the direction of electrical current can be reversed to flow downhole via the first work string 106 and uphole via the second work string 108. In various embodiments, the electrical signal can be an electrical current of constant or relatively constant amplitude. Alternatively, or in addition, the electrical signal can be coded signal, such as a binary signal, over which a command is sent to the device, and the device performs an action indicated by the received command.

FIG. 2 shows a wellbore system 200 in an alternate embodiment. The wellbore system 200 includes a first well 102 and a second well 104. The first well 102 is a vertical well. The second well 104 includes a vertical section 104a and a horizontal section 104b. In various embodiments, the first well 102 extends through the plurality of formations, i.e., Layer 1, . . . Layer N to at least the conductive formation layer 115. The vertical section 104a of the second well 104 also extends through the plurality of formations. In various embodiments, the vertical section 104a extends at least to a depth of the conductive formation layer 115. The horizontal section 104b then extends through the conductive formation layer 115. In various embodiments, the first work string 106 is disposed in the first well 102 and includes an electrical device 110 that resides within the electrically conductive formation layer 115. The second well 104 includes a second work string 108 having a vertical work string segment 108a and a horizontal work string segment 108b. The horizontal work string segment 108b resides in the electrically conductive formation layer and is at a depth at or below a bottom end of the first work string 106.

Figure 3:
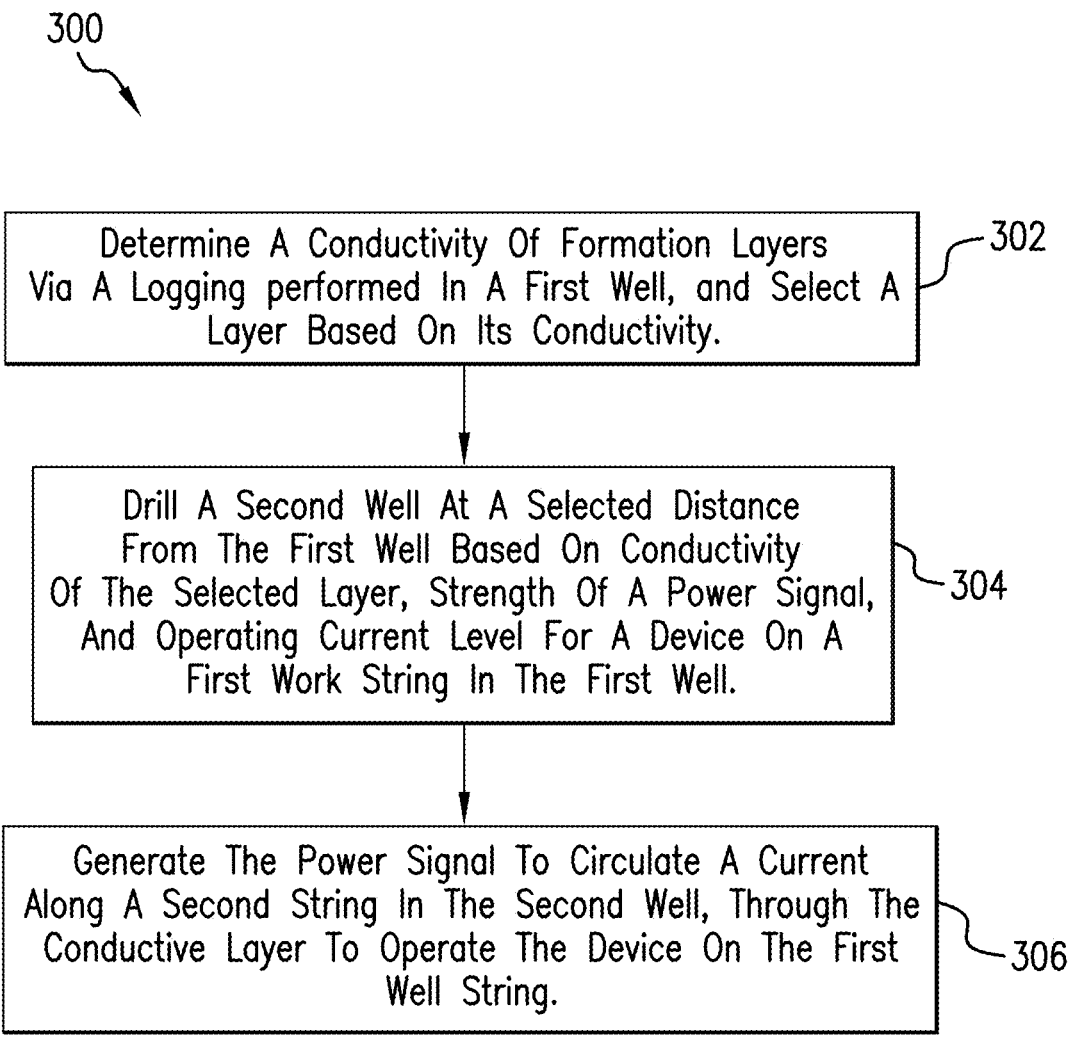
FIG. 3 shows a flow chart of an illustrative method for operating an electrical device downhole.

FIG. 3 shows a flow chart 300 of an illustrative method for operating an electrical device downhole. In box 302, a determination is made of an electrically conductive layer. The plurality of formation layers has a first well 102 passing therethrough and a resistivity logging tool is run through the first well 102 to determine the electrically conductive layer. In various embodiments, the conductivity of each of the plurality of formation layers is determined and a layer having the greatest conductivity is selected. However, a layer can be selected that is not the most conductive, given a desired selection criterion. Furthermore, more than one conductive layer can be selected.

In box 304, a second well 104 is drilled, placed or located at a selected distance from the first well 102. The distance between the first well 102 and second well 104 is selected so as to allow an electrical signal having a selected power or current level to pass between a first work string 106 disposed in the first well 102 and a second work string 108 disposed in a second well 104 via the conductive formation layer 115. The distance is therefore selected based on the resistivity or conductivity of the conductive formation layer 115. The distance is further selected based on a suitable power level or current level for operation of the electrical device 110 on the second work string 108 as well as a strength of a power signal introduced into the second work string 108 at the surface 114.

For the wellbore system 100 of FIG. 1, the selected distance is a distance between the first well 102 and the second well 104. For the wellbore system 200 of FIG. 2, the selected distance is a distance of closest approach between the first well 102 and a horizontal section 104b of the second well 104.

In box 306, the electrical signal is transmitted to the electrical device 110 in order to operate the electrical device 110. The electrical signal is generated by the current generator 126 and circulates along the second work string and through the electrically conductive layer to the first work string. Although the strength of the signal dissipates as the signal traverses the first work string and electrically conductive formation, the electrical signal received at the first work string has enough strength to operate the electrical device 110.

Figure 4:
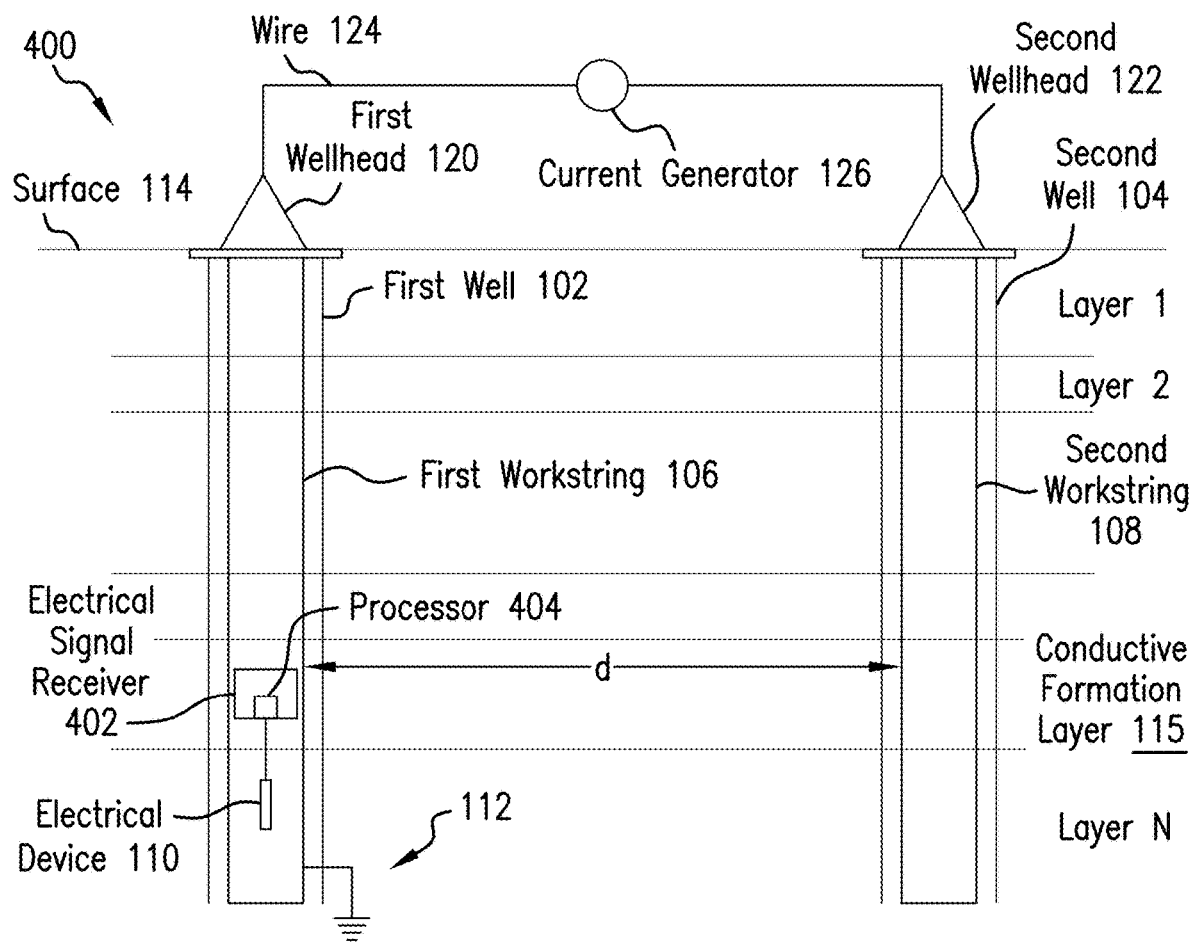
FIG. 4 shows a wellbore system having a first work string with an electrical device in an alternate embodiment.

FIG. 4 shows a wellbore system 400 having a first work string 106 with an electrical device 110 in an alternate embodiment. The electrical device 110 is disposed on the first work string 106 to reside in a layer other than the conductive formation layer 115. In various embodiments, the electrical device 110 resides in a non-conductive formation layer. The first work string 106 includes an electrical signal receiver 402 disposed in the conductive formation layer 115. The electrical signal receiver 402 is in communication with the electrical device 110. In operation, the electrical signal passing through the conductive formation layer 115 and is received at the electrical signal receiver 402. In response, a processor 404 of the electrical signal receiver 402 communicates an actuation signal to the electrical device 110 along the first work string 106 in order to actuate the electrical device 110.

It is to be understood that the wellbore systems disclosed herein are only illustrative and are not limited to having only a first well and a second well. Additional wells can be included in the wellbore system and electrical signals can be communicated between any the wells through a selected conductive formation layer by creating an electrical circuit using the methods disclosed herein.

FIG. 5a show side view of a formation showing a plurality of formation layers. Each formation layer has an associated resistivity ρ and layer thickness D. The top layer has thickness $D_1$ and resistivity $\rho_1$, the second layer has layer thickness $D_2$ and resistivity $\rho_2$. etc. The first well 102 and the second well 104 pass through this plurality of formation layers in order to reach a selected depth. The resistivity of the formation layers and the geometry formed by the first well 102 and second well 104 defines the equivalent resistivity between the wells. Therefore, the equivalent resistivity between the first well 102 and the second well 104 changes as the wells pass through successive formation layers.

FIG. 5b shows a formation between two vertical wellbores passing through horizontal formation layers. Each of the horizontal formation layers defines an electrically conductive path between the wells. In other words, formation 1 defines current path $P_1$, formation 2 defines current path $P_2$, etc. Each of the current paths $P_1, P_2, P_3, \ldots P_n$ are in parallel with each other. The equivalent resistivity $\rho_{eq}$ between two wells passing through i parallel formation layers is therefore given by Equation (1):

$$\rho_{eq} = \sum D_i / \left[ \left(\frac{\rho_1}{D_1}\right)^{-1} + \left(\frac{\rho_2}{D_2}\right)^{-1} + \ldots \left(\frac{\rho_i}{D_i}\right)^{-1} \right] \quad \text{Eq. (1)}$$

Figure 5C:
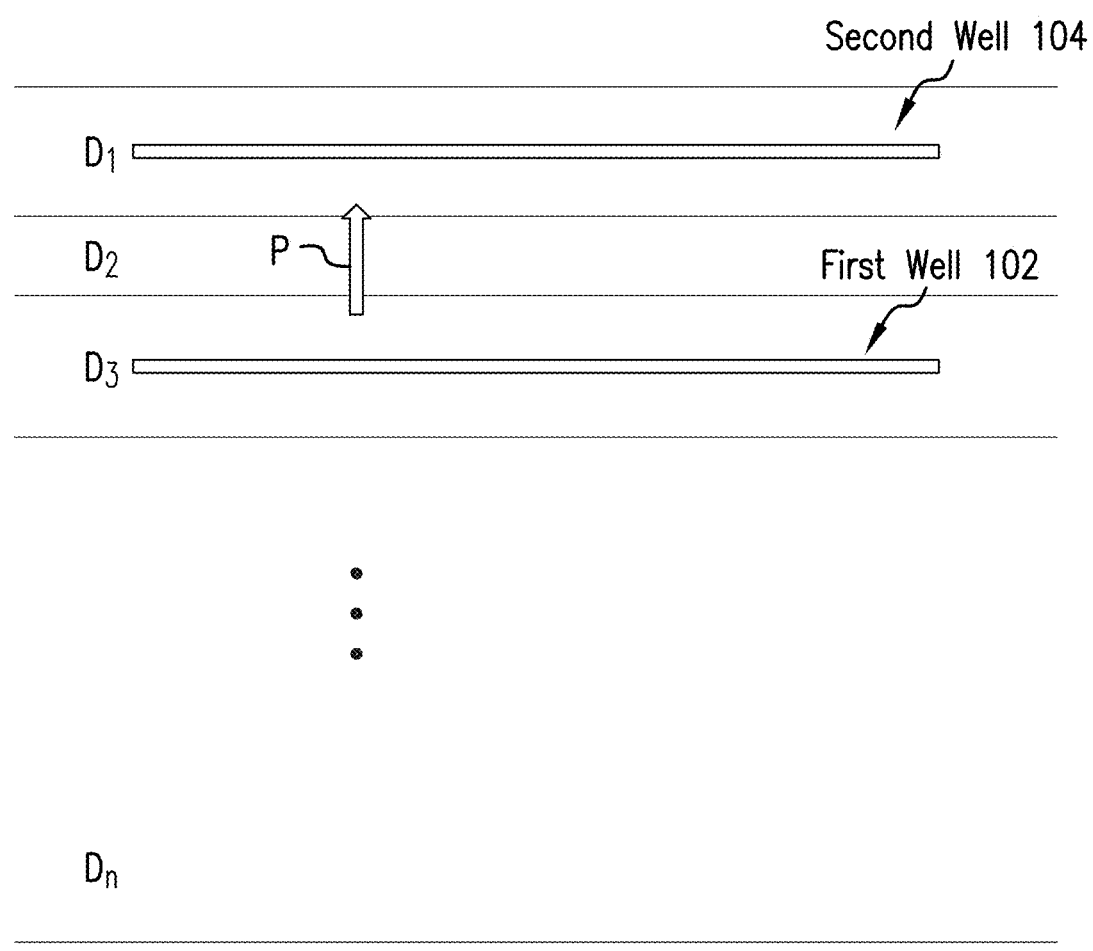
FIG. 5c shows a formation between two horizontal wellbore sections

FIG. 5c shows a formation between two horizontal wellbore sections. For illustrative purposes, the wellbores are passing through the top formation layer and the third formation layer from the top. An electrically conductive path P between the first well 102 and the second well 104 passes through the formation layers in series, resulting in an equivalent resistivity $\rho_{eq}$ between the two wells that is given by Equation (2):

$$\rho_{eq} = [\rho_1 * D_1 + \rho_2 * D_2 + \rho_3 * D_3 + \ldots] / \Sigma D \quad \text{Eq. (2)}$$

FIG. 6 shows the wellbore system 200 of FIG. 2 illustrating the various formation layers that the first well 102 and the second well 104 pass through. The first well 102 includes a vertical section that passes through formation layers 1 through 5. The second well includes a vertical section that passes through formation layers 1 through 5. At formation layer 5, the second well 104 deviates from the vertical section to form a horizontal section that passes horizontally through formation layer 5. The resistivity of the well system and various electrical characteristics of the well system are discussed below with respect to FIGS. 7-10.

FIG. 7 shows a relation of resistivity vs. depth for the illustrative wellbore system of FIG. 2. Resistivity (in ohm-m) is shown along the ordinate axis using a logarithmic scale, and depth (in feet) is shown along the abscissa. Curve 702 shows vertical resistivity (resistivity in the z direction) of each formation layer. Curve 704 shows horizontal resistivity (resistivity in the x-y plane) of each formation layer. For these formation layers, the vertical resistivity is about ten times greater than the horizontal resistivity.

Curve 706 shows a resulting composite resistivity for the well system of FIG. 2. The composite resistivity shows a wide variation between about 1 ohm-cm to about 500 ohm-cm in between the depths of 0 and about 5000 feet. Between depths of about 5000 feet and about 9000 feet, the composite resistivity is more or less with a range from between 5 ohm-cm and about 100 ohm-cm. Below a depth of about 9000 feet, the variation of the composite resistivity increases and is within a range from about 5 ohm-cm to about 1000 ohm-cm.

FIG. 8 shows a top-down view 800 of the well system of FIG. 2 showing, in particular, a voltage distribution along the horizontal section 104b. The first well 102 is shown at a horizontal offset form the horizontal section 104b. The voltage distribution is based on the first well 102 being grounded (i.e., held a zero volts) and a current of 1 Amp being applied to the wellhead of the second well 104. By injecting 1 Amp at the wellhead, a 42.7 millivolts (mV) occurs at the wellhead. A voltage of 21.5 mV occurs at the toe 802 or bottom end of the second well 104. Therefore, the voltage at toe 802 is about 50% of the wellhead voltage.

FIG. 9 shows a top-down view of the well system of FIG. 2, showing, in particular, a current density distribution along the horizontal section 104b. The first well 102 is shown at a horizontal offset from the horizontal section 104b. While the current at the wellhead of the second well 104 is 1 A, the current at the toe 802 of the second well is 0.515 milliamps (mA). Therefore, the current at the toe 802 is about 0.052% of the current injected into the first well at the second wellhead.

FIG. 10 shows a relation of voltage and current to total wellbore depth for the well system of FIG. 2. Depth is shown (in feet) along the abscissa. Voltage is shown in volts (V) along the left-hand ordinate axis. Current is shown in amps (A) along the right-hand ordinate axis using a logarithmic scale. The voltage curve 1002 starts at 42.7 mV and descends to about 21.5 mV at about 7000 feet, substantially maintaining the 21.5 mV at lower depths. The current curve 1004 starts at 1 A at the surface (0 feet) and decreases along a first region to about 0.3 A about a depth of 7000 feet. In a second region between about 7000 feet and 13000 feet, the current decreases to about 10 mA at 13000 feet. In a third region below 13000 feet, the current decrease to about 0.515 mA at 14000 feet.

FIG. 11 shows a relation of current and leakage current to depth for the well system of FIG. 2. Leakage current is shown along the left-hand ordinate axis in amps per meter (A/m). Current is shown in amps (A) along the right-hand ordinate axis using a logarithmic scale. The current curve 1004 is the same as shown in FIG. 10. The leakage current curve 1110 shown a leakage current of about 3×10-4 A/m at the surface (0 feet) and decreasing with depth. A comparison of FIG. 11 and FIG. 7 show that discontinuities in the leakage current occur at the interfaces between formation layers, as indicated, in part, by discontinuities 1101, 1102, 1103, 1104 and 1105.

FIG. 12 shows a wellbore system 1200 in another alternate embodiment. The wellbore system 900 includes a first well 102 and a second well 104. The first well 102 is a vertical well that extends below the conductive formation layer 115. The second well 104 includes a vertical section 104a and a horizontal section 104b. The vertical section 104a extends to the conductive formation layer 115 and the horizontal section then extends through the selected conductive layer. The first well 102 includes first work string 106 and the second well 104 includes second work string 108. The second work string 108 includes a vertical work string segment 108a and a horizontal work string segment 108b. The horizontal work string segment 108b is therefore at a depth at or above the bottom of the first work string 106. The horizontal section 104b does not intersect the first well 102, but instead extends along a path that is in a general neighborhood of the first well 102. In such configuration, the horizontal section 104b will have a point of closest approach to the first well 102, such point indicated by a location at which a line perpendicular to the horizontal section 104b intersects the first well 102.

FIG. 13 shows the well system of FIG. 12 illustrating the various formation layers that the first well 102 and the second well 104 pass through. The first well 102 includes a vertical section that passes through formation layers 1 through 6. The second well 104 includes a vertical section that passes through formation layers 1 through 5. At formation layer 5, the second well 104 deviates from the vertical section to form a horizontal section that passes horizontally through formation layer 5. Therefore, the horizontal section of the second well 104 comes to within a close distance of the vertical section of the first well 102. Electrical characteristics of wellbore system 1200 are discussed below with respect to FIGS. 14-15.

FIG. 14 shows a top-down view 1400 of the wellbore system 1200 of FIG. 12, showing, in particular, a voltage distribution along the horizontal work string segment 108b of the second work string 108. The first well 102 is shown at a horizontal offset from the horizontal work string segment 108b. The voltage distribution is based on the first well 102 being grounded (i.e., held a zero volts) and a current of 1 Amp being applied to the second wellhead 122 of the second well 104. By applying the 1 Amp at the second wellhead 122, a voltage of about 62.5 mV occurs at the wellhead. A resulting voltage of 32.1 mV occurs at the toe 1405 or bottom end of the first well 902. Therefore, the voltage is at toe 1405 is about 51% of the wellhead voltage.

FIG. 15 shows a top-down view of the wellbore system 1200 of FIG. 12 showing, in particular, a current density distribution along the horizontal section 104b. The first well 102 is shown at a horizontal offset from the horizontal section 104b. While the current at the wellhead of the second well 104 is 1 A, the current at the toe 1405 of the first well 1202 is 2.04 mA. Therefore, about 0.2% of the current injected into the second well 104 at the wellhead reaches the toe 1405.

FIG. 16 shows a simulated well system 1600 for determining the effect of wellbore spacing (d) on the electrical parameters of a circuit including a first well 102 and a second well 104 as well as the effect of wellbore depth (w) on the electrical parameters. The first well 102 and second well 104 are separated by wellbore spacing w and have depth d. The first well 102 and second well 104 are vertical wells and pass through a plurality of formations having formation thicknesses and resistivity characteristics as indicated in Table 1.

| Layer # | Depth Range (ft) | Vertical Resistivity (Ohm * m) | Horizontal Resistivity (Ohm * m) |
| --- | --- | --- | --- |
| 1 | 0 to 2000 | 528.7 | 19.8 |
| 2 | 2000 to 3000 | 141.0 | 14.3 |
| 3 | 3000 to 5000 | 56.1 | 6.8 |
| 4 | 5000 to 7000 | 21.2 | 5.8 |
| 5 | 7000 to 8500 | 31.4 | 14.7 |
| 6 | 8500 to 9250 | 84.2 | 22.8 |
| 7 | 9250 to 10000 | 102.5 | 36.1 |
| 8 | 10000 to 11000 | 208.4 | 20.4 |
| 9 | 11000 to 12000 | 161.3 | 10.6 |
| 10 | 12000 to 13000 | 295.9 | 82.5 |
| unused | 13000 to 13249 | 15.1 | 11.8 |

FIG. 17 shows a relation 1700 between well current and depth for a plurality of well spacings w between the first well 102 and the second well 104. Current is shown (in amps) via a logarithmic scale along the ordinate axis with depth being shown (in feet) along the abscissa. Illustrative well spacings are 5 feet, 10 feet, 20 feet, 50, feet, 100 feet, 200 feet, 500 feet, 1000 feet, 2000 feet, 5000 feet, 10000 feet, and 30000 feet. At the surface, the injected current at all spacings is 1 A. As evident from FIG. 17, the well current decreases more rapidly with depth for wells that are closer together than for the well that are spaced further apart. Thus, at a depth of about 11,500 feet the current available for wells spaced by 5 feet is 100 times less than the current available for wells that are spaced 20000 feet apart.

FIG. 18 shows a relation 1800 between well voltage and depth for the plurality of well spacings of FIG. 17. Voltage is shown (in volts) long the ordinate axis with depth being shown (in feet) along the abscissa. The voltage at the surface (surface voltage) varies with well spacing w with the greatest surface voltage (e.g. about 44 mV) occurs for the wells separated by the greatest spacing (e.g., 30000 feet). The smallest surface voltage (e.g. about 21 mV) occurs for the wells separated by the least spacing (e.g., 5 feet). The differences in surface voltages is reflected in the decay of voltage with depth. The wells having the greatest separation display the most voltage at any given depth, while the wells having the smallest separation maintain the least voltage at any given depth, with the voltage at any given depth varying with well spacing.

FIG. 19 shows a relation 1900 between well current leakage and depth for the plurality of well spacings of FIG. 17. The current leakage at the surface is greatest for the wells having smallest horizontal spacing and the current leakage at the surface is the least for the wells having the greatest spacing. Between the depths of 0 feet to about 3000 feet, this relation remains unchanged, with current leakage being inversely related to the spacing between wells. However, below about 3000 feet, this relation changes. In other words, below about 3000 feet, the wells having the smallest spacing has the least current leakages and the wells having the largest spacing have the most current leakage. This can be understood by understanding that having a large amount of current leakage above a depth of about 300 feet (as in the closely spaced wells) leaving less current to be leaked at lower levels. In addition, for the wells having large spacing between them, current that is not leaked out above a depth of about 300 feet is available for leaking at the lower levels. From FIGS. 17-19, it can be concluded that greater spacing between wells allows for more current available for use downhole using the methods disclosed herein.

FIG. 18 shows a relation 1800 between power and well spacing for selected wellbore depths. Power (in Watts) is shown along the ordinate while well spacing (in feet) is shown along the abscissa. Curve 1802 shows a wellhead power for various well spacings. Curve 1804 shows the power at a well depth of 5000 feet. Curve 1806 shows the power at a well depth of 10000 feet. At a wellbore spacing greater than about 2000 feet, the power at various depths is the same or substantially the same with wellbore spacing, although power shows a slight increase for well spacings between 10000 ft and 30000 ft.

FIG. 19 shows a relation 1900 between amperage and well spacings for selected wellbore depths. Current (in Amps) is shown along the ordinate while well spacing (in feet) is shown along the abscissa. A current of 1 A is injected at the surface. Curve 1904 shows a current at a well depth of 5000 feet. Curve 1806 shows a current at a well depth of 10000 feet.

FIG. 20 shows a relation 2000 between percent voltage and well spacing for selected wellbore depths. Percent voltage is shown (in percent) along the ordinate while well spacing (in feet) is shown along the abscissa. Curve 2002 shows that the voltage at a well depth of 5000 feet is about 65% of the voltage at the surface. Curve 2004 shows that the voltage at a well depth of 10000 feet is about 52% of the voltage at the surface.

From FIGS. 17-22, it can be understood that increasing the well spacing increases the current at selected depths in the wellbore and increase the depth at which the current can be sent into the well. In addition, increasing the well spacing increase the voltage through the well. A current injection of 1A at the surface is sufficient in order to provide detectable signals downhole.

Referring again to FIG. 17, the wellbore depth (w) can be changed and the effect of wellbore depth on the electrical parameters of the well system can be studied. For the studies shown in FIGS. 23-29, the wellbore depth w is changed while the wellbore spacing d is kept constant at about 1000 feet. Referring to the Table 1, the formation layers 6, 7 and 8 are resistive layers. The effect of wellbore depth is studied via a first well having a depth of 7000 feet, a second well having a depth of 9000 feet and a third well having a depth of 11,500 feet. The toe of the first well resides at a location near but above the resistive layer. The toe of the second well resides within the resistive layer. The toe of the third well resides at a location below the resistive layer.

FIG. 23 shows a relation 2300 of well current vs. depth for the three illustrative well depths. Current is shown in amps within a logarithmic scale along the ordinate and depth is shown in feet along the abscissa. Curve 2302 shows the current in the first well and shows the current at the toe of the first well to be about 8 mA. Curve 2304 shows the current in the second well and shows the current at the toe of the second well to be about 1 mA. Curve 2306 shows the current in the third well and shows the current at the toe of the third well to be about 0.7 mA FIG. 24 shows a relation 2400 of voltage vs. depth for the three illustrative well depths. Voltage is shown in volts along the ordinate and depth is shown in feet along the abscissa. Curve 2402 shows the voltage in the first well and shows the electromotive force at the toe of the first well to be about 21 mV. Curve 2404 shows the voltage in the second well and shows the electromotive force at the toe of the second well to be about 19.5 mV. Curve 2406 shows the voltage in the third well and shows the electromotive force at the toe of the third well to be about 19 mV.

FIG. 25 shows a relation 2500 of current leakage vs. depth for the three illustrative well depths. Current leakage is shown in amps/meter along the ordinate and depth is shown in feet along the abscissa. Curve 2502 shows the current leakage in the first well and shows the current leakage at the toe of the first well to be about 0.35 mA/m. Curve 2504 shows the current leakage in the second well and shows the current leakage at the toe of the second well to be about 0.05 mV. Curve 2506 shows the current leakage in the third well and shows the current leakage at the toe of the third well to be about 0.025 mV.

FIG. 26 shows a relation 2600 between power and toe depth for the three illustrative well depths. Power (in Watts) is shown along the ordinate while toe depth (in feet) is shown along the abscissa. Dashed lines are shown to connect data points from the same well. Dashed line 2602 connects power data points in the 7000 foot well, including the wellhead power (about 40 mW) and a power 2312 at 5000 feet (about 20 mW) as well as the power 2622 at the toe depth (about 0.3 mW). Dashed line 2604 connects power data points in the 9000 ft well, include the wellhead power (about 40 mW), a power 2614 at 5000 feet (about 10 mW) as well as the power 2624 at the toe depth (about 0.06 mW). Dashed line 2606 connects power data points in the 11500 ft well, include the wellhead power (about 40 mW), a power 2616 at 5000 feet (about 7 mW) as well as the power 2626 at the toe depth (about 0.02 mW). Clearly, there is less power at the bottom of the longest well than at the bottom of the shorter wells.

FIG. 27 shows a relation 2700 between percent amperage and toe depth for the three illustrative well depths. Current percentage (in %) is shown along the ordinate while well spacing (in feet) is shown along the abscissa. Current is shown as a percentage of the injection current at the surface. Dashed line 2702 connects current percentage data points in the 7000 foot well, including the current percent 2712 at about 5000 feet (i.e., about 60%) as well as the current percent 2722 at the toe depth (about 1.5%). Dashed line 2704 connects current percentage data points in the 9000 ft well, include the current percent 2714 (about 40%) as well as the current percent 2724 at the toe depth (about 0.23%). Dashed line 2706 connects current percentage data points in the 11500 ft well, include the current percent 2716 at 5000 feet (about 27%) as well as the current percent 2726 at the toe depth (about 0.12%).

FIG. 28 shows a relation 2800 between percent voltage and toe depth for the three illustrative well depths. Percent voltage (in %) is shown along the ordinate while well spacing (in feet) is shown along the abscissa. Dashed line 2802 connects voltage percentage connects voltage percentage data points in the 7000 foot well, including the voltage percent 2812 at about 5000 feet (i.e., about 74%) as well as the voltage percent 2822 at the toe depth (about 55%). Dashed line 2804 connects voltage percentage data points in the 9000 ft well, include the voltage percent (about 69%) as well as the voltage percent at the toe depth (about 52%). Dashed line 2806 connects voltage percentage data points in the 11500 ft well, including the voltage percent at 5000 feet (about 60%) as well as the voltage percent the toe depth (about 50%).

From FIGS. 23-28, it can be understood that deeper well transmit more current at identical depths. The shallowest well (i.e., the well having its toe above the resistive zone) transmits the most current to the to the bottom. Shallower wells tend to have more current leakage at identical depths. As the well gets deeper, less power, less current and a smaller percentage of voltage reaches the toe.

Set forth below are some embodiments of the foregoing disclosure:

Embodiment 1

A method of drilling a wellbore system, including determining a conductive formation layer from a plurality of formation layers having a first well extending therethrough, the first well having a first work string therein, the first work string including a device, placing a second well at a distance from the first well, the distance selected to allow communication of an electrical signal between the first well and the second well through the conductive formation layer based on a resistivity of the electrically conductive formation layer, disposing a second work string in the second well; and communicating the electrical signal from the second work string to the first work string through the electrically conductive formation layer to operate the device.

Embodiment 2

The method as in any prior embodiment forming an electrical circuit between the first work string and the second work string via the conductive formation layer and an electrical connection between the first work string and the second work string at a surface location.

Embodiment 3

The method as in any prior embodiment supplying a reverse electrical signal from the first work string to the second work string.

Embodiment 4

The method as in any prior embodiment wherein the first well includes a horizontal segment at a horizontal segment depth, and the first work string extends in the first well to a depth equal to or greater than the horizontal segment depth.

Embodiment 5

The method as in any prior embodiment wherein the device is located in a formation layer other than the conductive formation layer, further including communicating the electrical signal to an electrical receiver disposed on the first work string within the conductive formation layer, and communicating an actuation signal from the receiver to the device along the first work string.

Embodiment 6

The method as in any prior embodiment selecting the distance between the first well and the second well based on the resistivity of the electrically conductive formation, a signal threshold of the device and a strength of the signal at a surface location.

Embodiment 7

The method as in any prior embodiment wherein the device is one of a trigger sleeve, a frac sleeve and a liner hanger.

Embodiment 8

The method as in any prior embodiment wherein the electrical signal is at least one of an electrical current and a coded electrical signal.

Embodiment 9

A wellbore system including a first well extending through a plurality of formations, the first well having a first work string disposed therein, the plurality of formations including a conductive formation layer, a second well extending through the conductive formation layer, the second well having a second work string disposed therein, the second well located at a distance from the first well, the distance selected to allow communication of an electrical signal between the first well and the second well through the electrically conductive formation layer based on a resistivity of the electrically conductive formation layer, a downhole device on the first work string operable using the current conducted from the second well to the first well, and an electrical signal generator for injecting the current into the second work string, wherein the electrical signal passes from the second work string to the first work string via the electrically conductive formation layer to operate the device.

Embodiment 10

The wellbore system as in any prior embodiment, further including a conductive element between the first work string and the second work string at a surface location to form an electrical circuit including the first work string, the second work string and the conductive formation layer.

Embodiment 11

The wellbore system as in any prior embodiment, wherein the second well includes a horizontal segment at a horizontal segment depth, and the first work string extends in the first well to a depth equal to or greater than the horizontal segment depth.

Embodiment 12

The wellbore system as in any prior embodiment, wherein the device is located in a formation layer other than the electrically conductive formation layer, further including an electrical receiver disposed on the first work string within the conductive formation layer that receives the electrical signal through the conductive formation layer and, in response, communicates an actuation signal to the device along the first work string.

Embodiment 13

The wellbore system as in any prior embodiment, wherein the distance between the first well and the second well is selected based on the resistivity of the conductive formation, a signal threshold of the device and a strength of the signal generator at a surface location

Embodiment 14

The wellbore system as in any prior embodiment, wherein the first well and second well are uncased wells.

Embodiment 15

The wellbore system as in any prior embodiment, wherein the device is one of a trigger sleeve, a frac sleeve and a liner hanger.

Embodiment 16

The wellbore system as in any prior embodiment, wherein the electrical signal is at least one of an electrical current and a coded electrical signal.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method of drilling a wellbore system, comprising:
   determining an electrically conductive formation layer from a plurality of formation layers having a first well extending therethrough, the first well having a first work string therein, the first work string including an electrical device within a formation layer other than the electrically conductive formation layer;
   placing a second well at a distance from the first well, wherein the distance is selected to allow communication of an electrical signal between the first well and the second well through the electrically conductive formation layer based on a resistivity of the electrically conductive formation layer and a leakage current at a depth of the electrically conductive formation layer;
   disposing a second work string in the second well;
   communicating the electrical signal from a surface location along the second work string through the electrically conductive formation layer and to an electrical receiver disposed on the first work string within the electrically conductive formation layer; and sending an actuation signal to the electrical device to operate the electrical device in response to receiving the electrical signal at the receiver.

2. The method of claim 1, further comprising forming an electrical circuit between the first work string and the second work string via the electrically conductive formation layer and an electrical connection between the first work string and the second work string at the surface location along the second work string.

3. The method of claim 1, further comprising supplying a reverse electrical signal from the first work string to the second work string.

4. The method of claim 1, wherein the first well includes a horizontal segment at a horizontal segment depth, and the first work string extends in the first well to a depth equal to or greater than the horizontal segment depth.

5. The method of claim 1, wherein the formation layer other than the electrically conductive formation layer is a non-conductive formation layer.

6. The method of claim 1, further comprising said selecting the distance between the first well and the second well based on the resistivity of the electrically conductive formation layer, a signal threshold of the electrical device and a strength of the electrical signal at the surface location along the second work string.

7. The method of claim 1, wherein the electrical device is one of a trigger sleeve, a frac sleeve and a liner hanger.

8. The method of claim 1, wherein the electrical signal is at least one of an electrical current and a coded electrical signal.

9. A wellbore system, comprising:
   a first well extending through a plurality of formations, the first well having a first work string disposed therein, the plurality of formations including an electrically conductive formation layer;
   a second well extending through the electrically conductive formation layer, the second well having a second work string disposed therein, the second well located at a distance from the first well, the distance is selected to allow communication of an electrical signal between the first well and the second well through the electrically conductive formation layer based on a resistivity of the electrically conductive formation layer and a leakage current at a depth of the electrically conductive formation layer;
   a downhole device on the first work string operable using a selected current conducted from the second well to the first well, wherein the downhole device is located in a formation layer other than the electrically conductive formation layer;
   an electrical receiver disposed on the first work string within the electrically conductive formation layer; and an electrical signal generator at a surface location along the second work string for injecting the selected current into the second work string, wherein the electrical signal passes from the second work string to the first work string via the electrically conductive formation layer to be received at the electrical receiver, wherein the electrical receiver communicates an actuation signal to the downhole device along the first work string to operate the downhole device in response to receiving the electrical signal.

10. The wellbore system of claim 9, further comprising a conductive element between the first work string and the second work string at the surface location to form an electrical circuit including the first work string, the second work string and the electrically conductive formation layer.

11. The wellbore system of claim 10, wherein the second well includes a horizontal segment at a horizontal segment depth, and the first work string extends in the first well to a depth equal to or greater than the horizontal segment depth.

12. The wellbore system of claim 9, wherein the downhole device is located in a non-conductive formation layer.

13. The wellbore system of claim 9, wherein the distance between the first well and the second well is selected based on the resistivity of the electrically conductive formation layer, a signal threshold of the downhole device and a strength of the electrical signal generator at the surface location.

14. The wellbore system of claim 9, wherein the first well and second well are uncased wells.

15. The wellbore system of claim 9, wherein the downhole device is one of a trigger sleeve, a frac sleeve and a liner hanger.

16. The wellbore system of claim 9, wherein the electrical signal is at least one of an electrical current and a coded electrical signal.

* * * * *